United States Patent [19]

Kobayashi

[11] Patent Number: 5,781,818
[45] Date of Patent: Jul. 14, 1998

[54] SYSTEM FOR COMMUNICATION BETWEEN CAMERA AND ACCESSORY

[75] Inventor: Ryuichi Kobayashi, Tokyo, Japan

[73] Assignee: Canon Kabushiki Kaisha, Tokyo, Japan

[21] Appl. No.: 845,768

[22] Filed: Apr. 28, 1997

[30] Foreign Application Priority Data

May 10, 1996 [JP] Japan ................... 8-139674

[51] Int. Cl.$^6$ ................... G03B 17/14
[52] U.S. Cl. ................... 396/529; 396/544
[58] Field of Search ................... 396/529, 532, 396/544, 300, 91

[56] References Cited

U.S. PATENT DOCUMENTS

| | | | |
|---|---|---|---|
| 4,734,732 | 3/1988 | Nishio et al. | 354/173 |
| 4,845,522 | 7/1989 | Kataoka | 354/412 |
| 4,860,113 | 8/1989 | Miyamoto et al. | 358/225 |
| 4,942,413 | 7/1990 | Saegusa et al. | 354/173.11 |
| 5,223,877 | 6/1993 | Kawasaki et al. | 354/286 |

FOREIGN PATENT DOCUMENTS 63-038926  2/1988  Japan .

OTHER PUBLICATIONS

European Search Report dated Sep. 26, 1997.

*Primary Examiner*—W. B. Perkey
*Attorney, Agent, or Firm*—Fitzpatrick, Cella, Harper & Scinto

[57] ABSTRACT

In a camera system arranged to communicate data between a camera and an accessory mounted on the camera in synchronism with a clock signal, the lens communicates data to the camera by a first communication method (an open drain method), and, if it is determined as a result of the data communication that the lens mounted on the camera is a lens suited for high-speed communication, the first communication method is switched to a second communication method suited for high-speed communication, so that communication can be performed at a high speed.

42 Claims, 16 Drawing Sheets

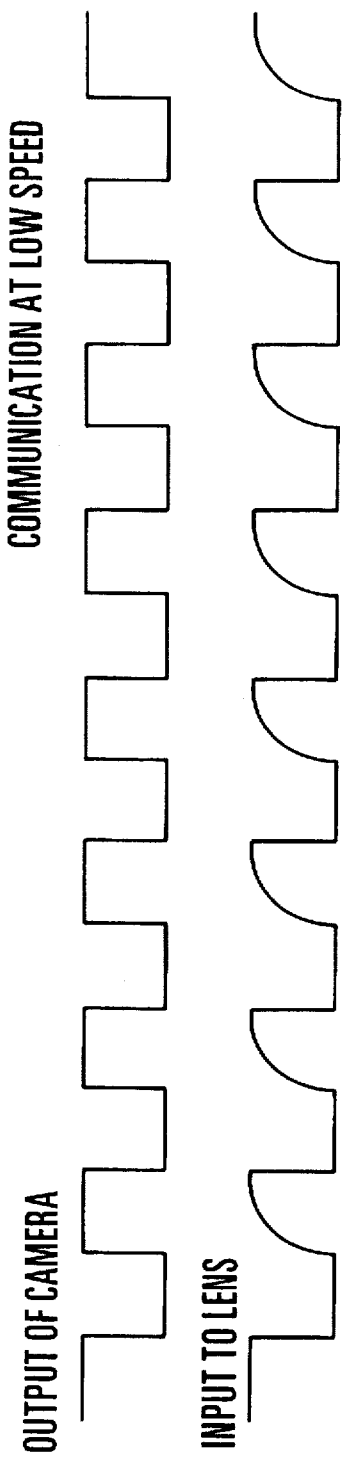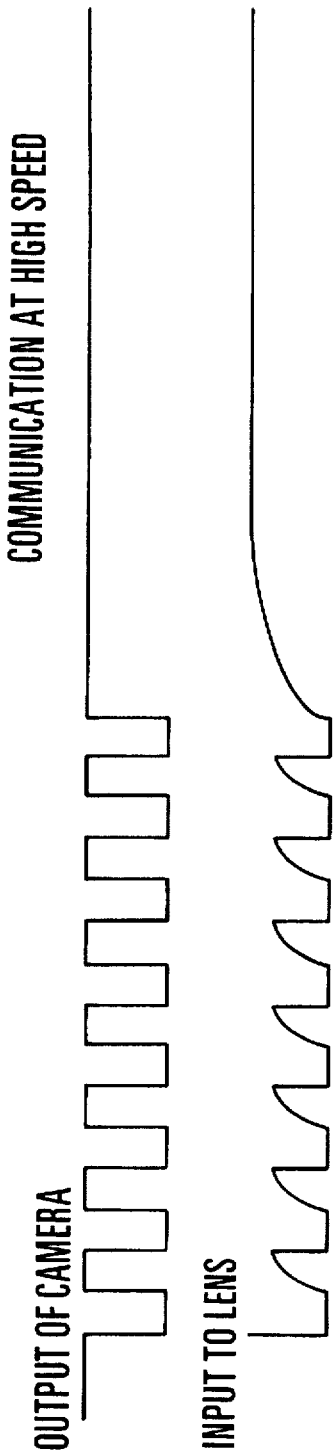

SYSTEM FOR COMMUNICATION BETWEEN CAMERA AND ACCESSORY

BACKGROUND OF THE INVENTION

1. Field of the Invention

This invention relates to a camera of the kind arranged to exchange (give and receive) information by communication, and relates to an improvement of an interchangeable lens arranged to be mounted on such a kind of camera and to exchange information with the camera by communication.

2. Description of Related Art

Communication between a camera and a lens has heretofore been arranged to be conducted in a manner called an open drain method, which is such as that shown in FIG. 14. A low-level signal from the camera is allowed to be transmitted to the lens through a terminal 96 by turning on an NMOS (n-channel metal oxide semiconductor) gate 92. A high-level signal from the camera is allowed to be transmitted to the lens by turning off the NMOS gate 92, while being pulled up by a pull-up resistor 93 which is disposed on the side of the lens.

An advantage of the open drain method lies in that the provision of the resistor 93 between a power supply and the ground eliminates the possibility of having an exothermic or igniting state of the terminal 96 even in the event of occurrence of some accident causing the terminal 96 to be grounded.

The lens is also provided with an NMOS gate 94 through which a low-level signal can be transmitted from the lens to the camera.

According to the conventional arrangement, the camera is arranged to send to the lens a clock signal for serial communication, while the lens is arranged to send a busy signal to the camera. Thus, one signal is used in each of the two directions.

In a case where a higher speed of communication is required for improvement in operating speed of the camera, however, the communication by the open drain method has presented a problem as described below.

FIGS. 15(A) and 15(B) are timing charts in the open drain method.

FIG. 15(A) shows a case where the clock signal outputted from the camera is transmitted to the lens by low speed communication. In this case, when the NMOS gate 92 turns off, the terminal 96 is pulled up by the resistor 93. However, a level at the terminal 96 does not immediately become high due to a parasitic capacity of the terminal 96, etc., but slowly rises in a state showing a capacitance-resistance (CR) charging curve.

Although the level of the clock signal inputted to the lens is allowed to sufficiently rise when the communication is conducted at a low speed as shown in FIG. 15(A), the level is not allowed to fully rise to a high level if the communication is conducted at a high speed as shown in FIG. 15(B).

To solve this problem, a complementary metal oxide semiconductor (CMOS) method is developed. Driving by the CMOS method, as shown in FIG. 16, sufficiently quickens the rise of the input level. According to the CMOS method, however, if the terminal 96 happens to be grounded, a short circuit would take place between the ground and a power supply to bring about a state of running the hazard of heat generation and ignition.

Further, in sending a signal from the lens to the camera, a short circuit takes place between the power supply and the ground when the NMOS gate 94 and a p-channel metal oxide semiconductor (PMOS) gate 97 are turned on. Hence, the CMOS method makes it impossible to mount a lens of the conventional open-drain communication type on a camera as an interchangeable lens.

BRIEF SUMMARY OF THE INVENTION

It is one aspect of this invention to provide a camera, a lens, or a camera system arranged to form a communication system which permits communication between a camera and an interchangeable lens adapted for a novel communication method and yet retains interchangeability with an interchangeable lens adapted for the conventional communication method.

It is another aspect of this invention to provide a camera, an lens or a camera system arranged to form a communication system which permits communication between a camera and an interchangeable lens adapted for a novel communication method of the CMOS type and yet retains interchangeability with an interchangeable lens adapted for the conventional open drain type communication method.

It is a further aspect of this invention to provide a camera, an accessory, or a camera system arranged to form a communication system which is arranged to perform communication of information by a first communication method, to make a check, on the basis of data obtained with the communication by the first communication method, to find if an accessory (interchangeable lens) mounted on a camera is suited to a second communication method, and, if so, to switch the first communication method over to the second communication method.

It is a further aspect of this invention to provide a camera, an accessory, or a camera system arranged to form a communication system in which the first communication method is an open drain method and the second communication method is a CMOS method.

It is a still further aspect of this invention to provide a camera, an accessory, or a camera system arranged to form a communication system which is capable of conducting communication between the camera and the accessory at a high speed by turning on, for a short period of time, a switching element disposed on the side of a power supply line while a switching element disposed on the side of a ground line is in an off-state.

These and other aspects and features of this invention will become apparent from the following detailed description of a preferred embodiment thereof taken in connection with the accompanying drawings.

3

Figure 6:
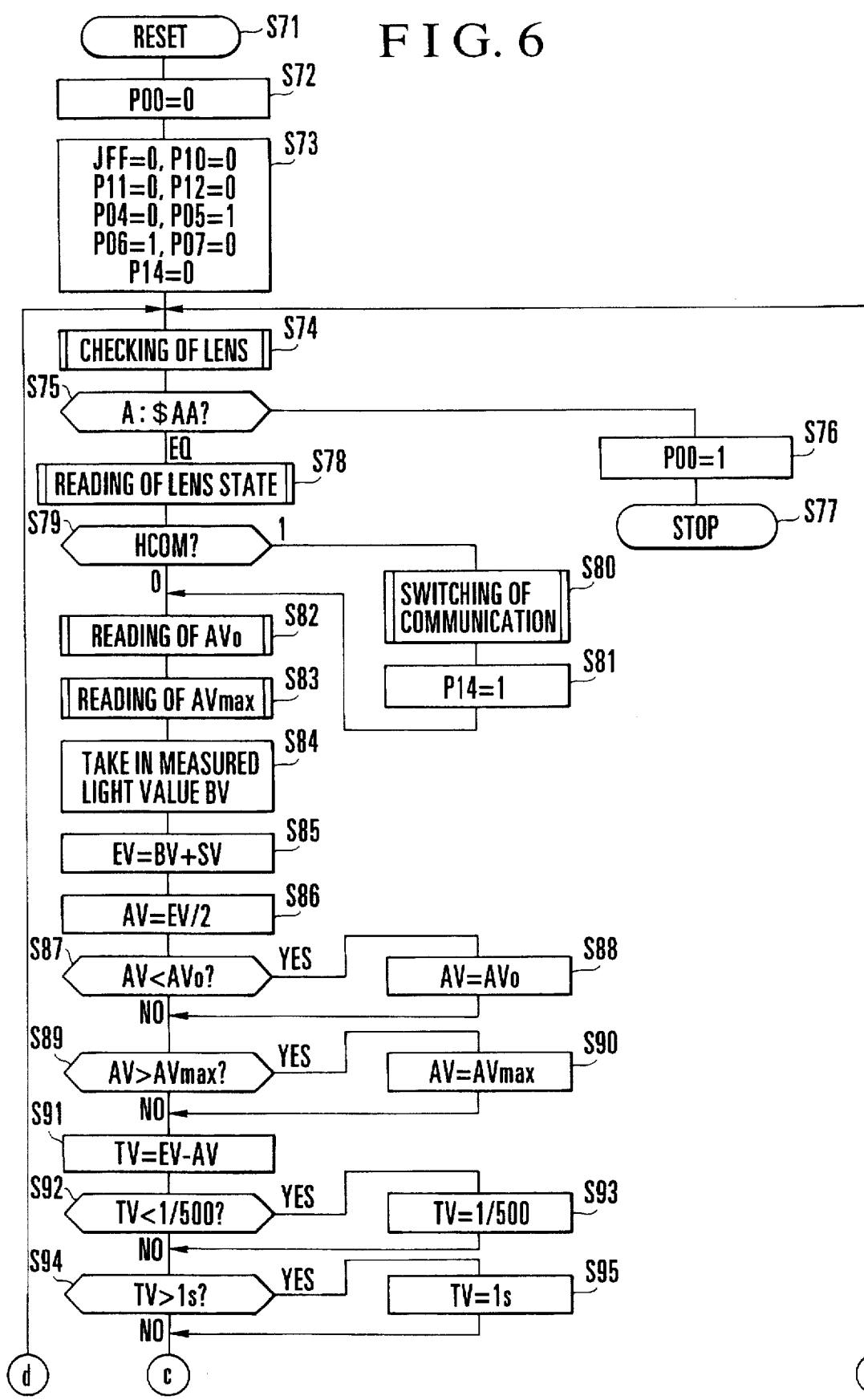
FIG. 6 is a flow chart showing in part a control operation of a camera control microcomputer shown in FIG. 1.
Figure 7:
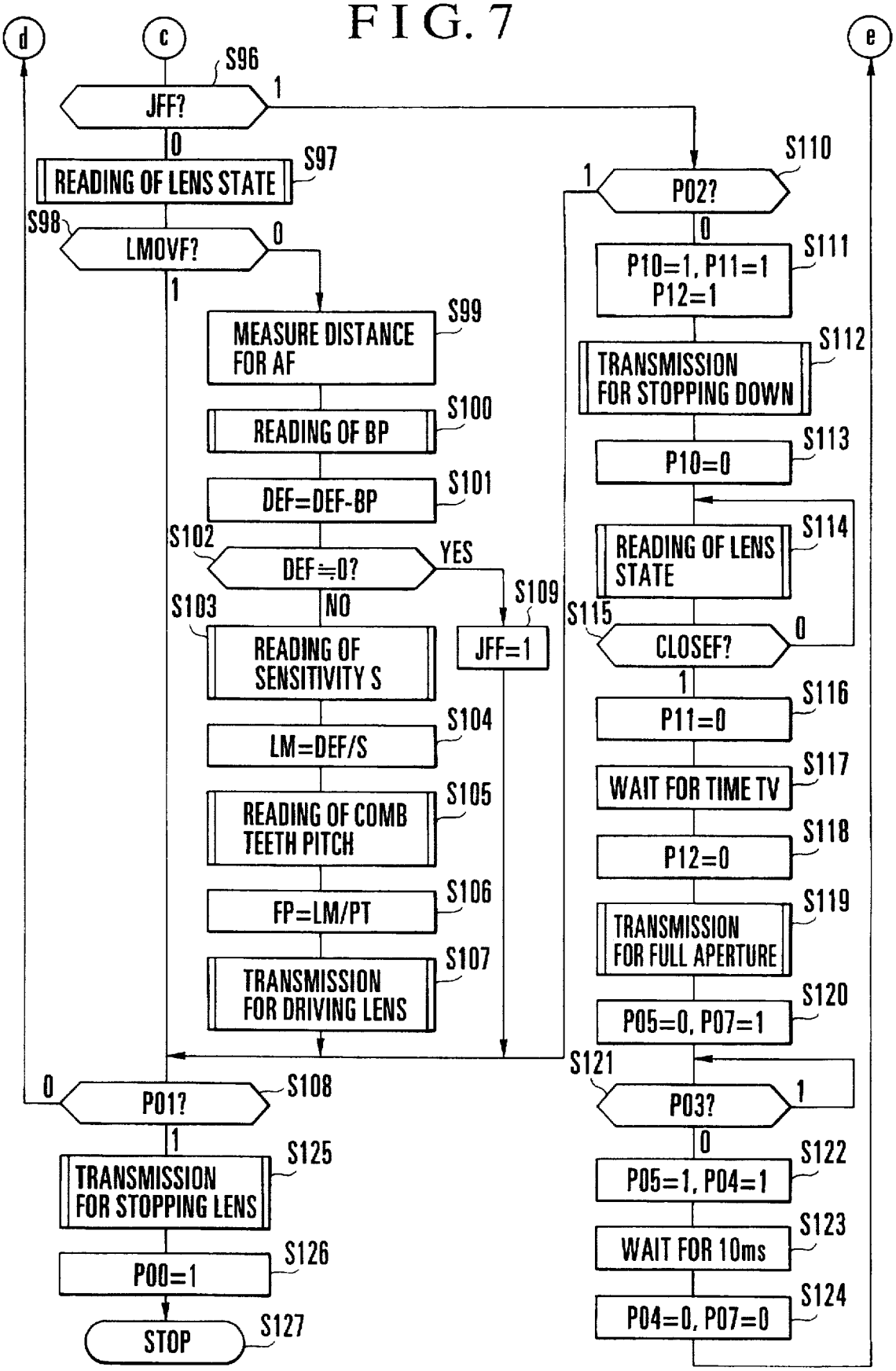

FIG. 7 is a flow chart showing the operation of the camera control microcomputer as continuing from FIG. 6.

Figure 8A:
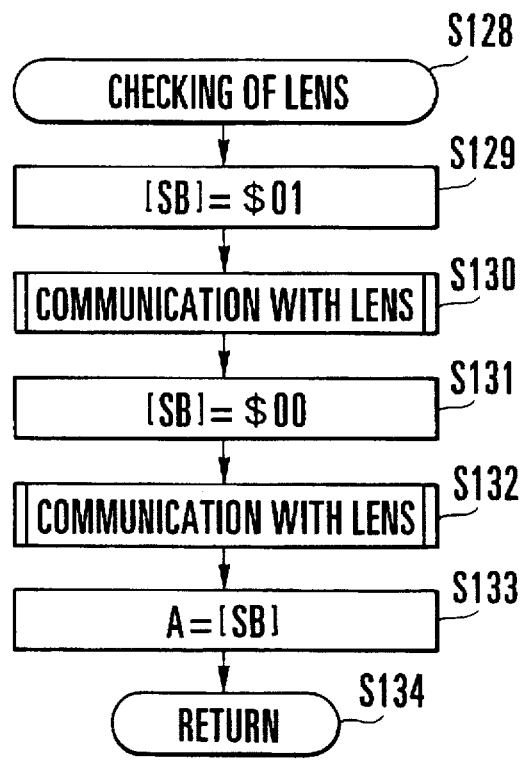
Figure 8B:
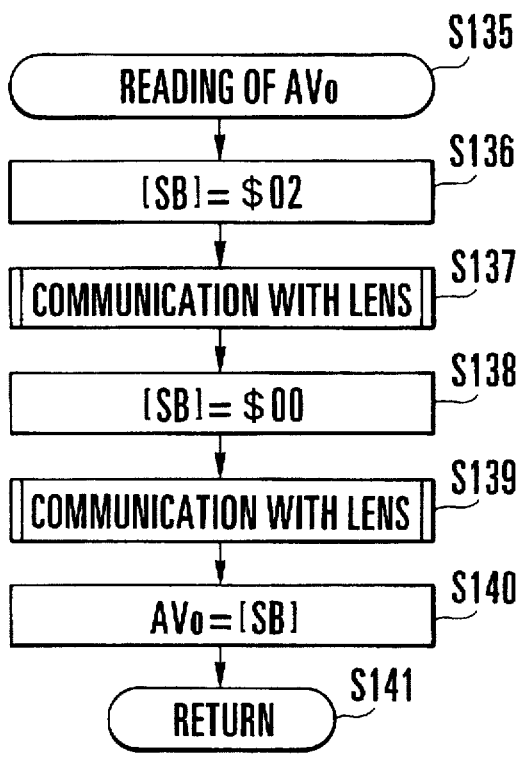
Figure 8C:
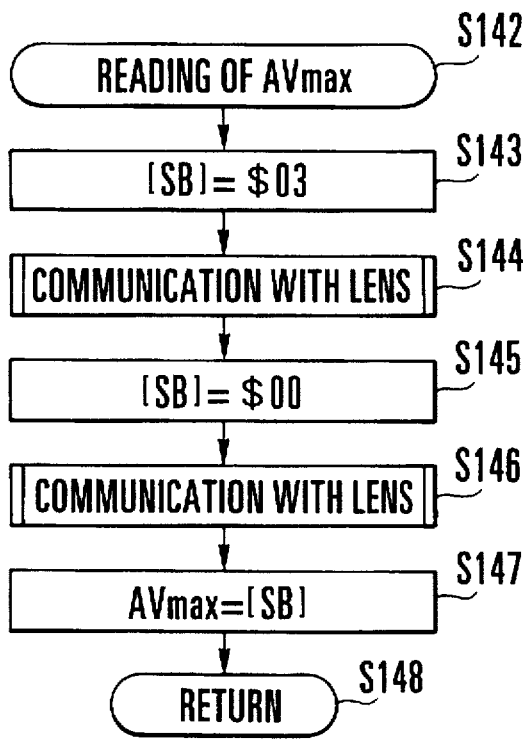

FIGS. 8(A), 8(B) and 8(C) are flow charts showing subroutines to be called at steps of the flow charts shown in FIGS. 6 and 7.

Figure 9A:
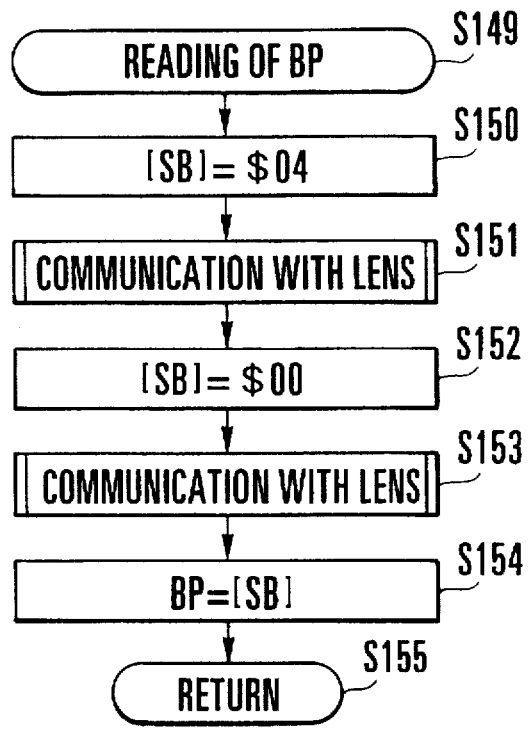
Figure 9B:
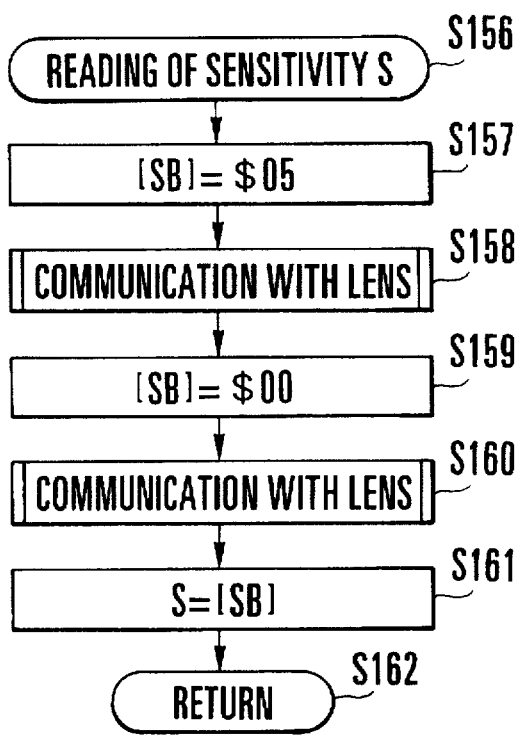
Figure 9C:
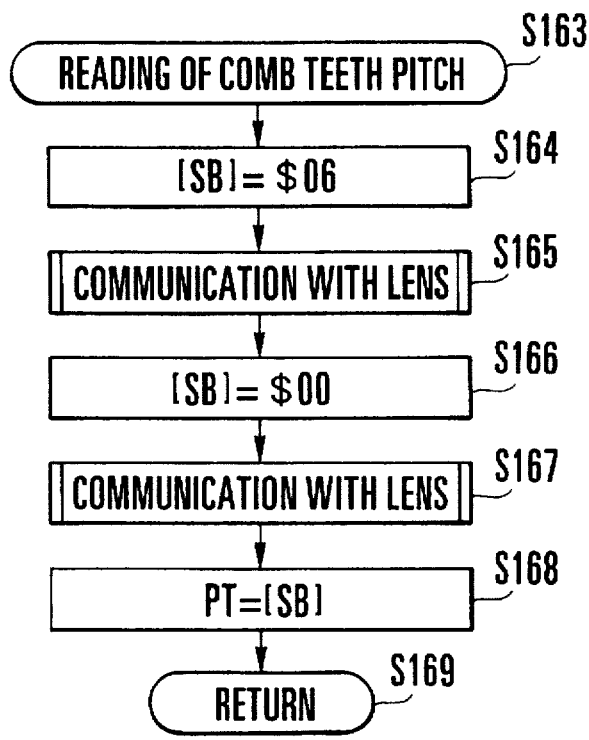

FIGS. 9(A), 9(B) and 9(C) are flow charts showing subroutines to be called also at steps of the flow charts shown in FIGS. 6 and 7.

Figure 10:
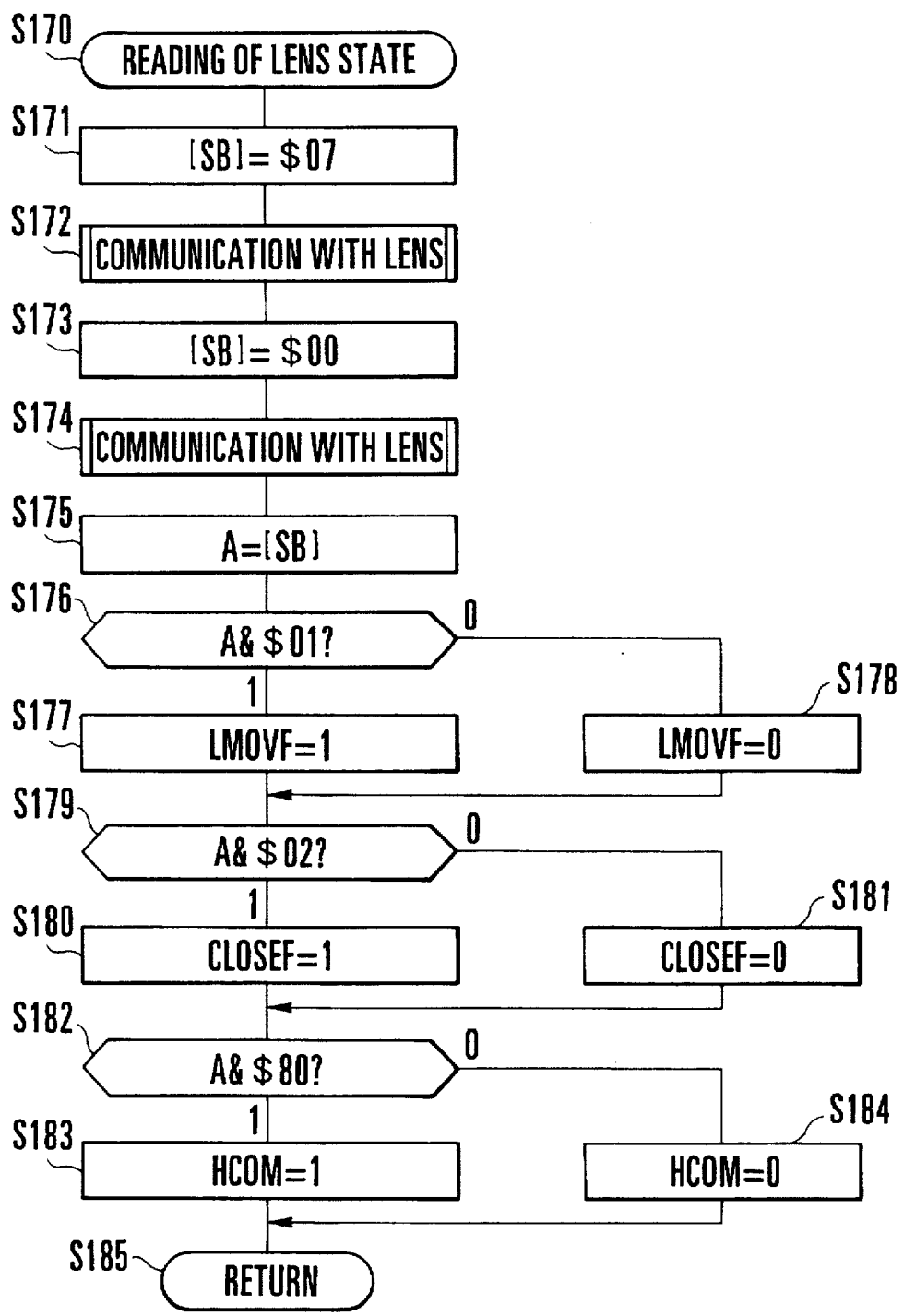

FIG. 10 is a flow chart showing a subroutine to be called also at steps of the flow charts shown in FIGS. 6 and 7.

Figure 11A:
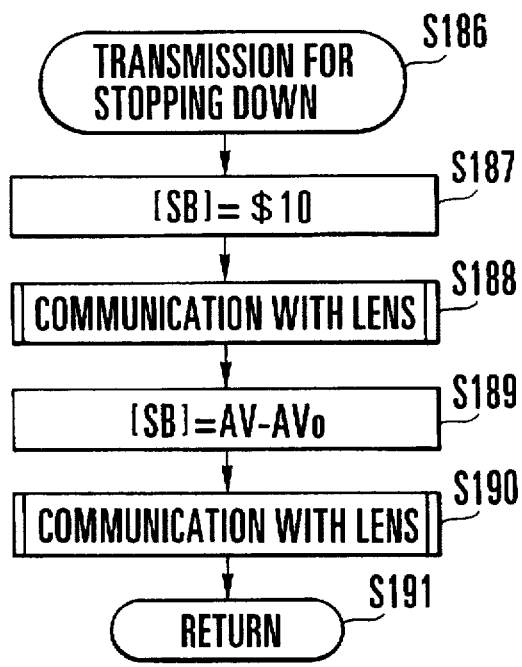
Figure 11B:
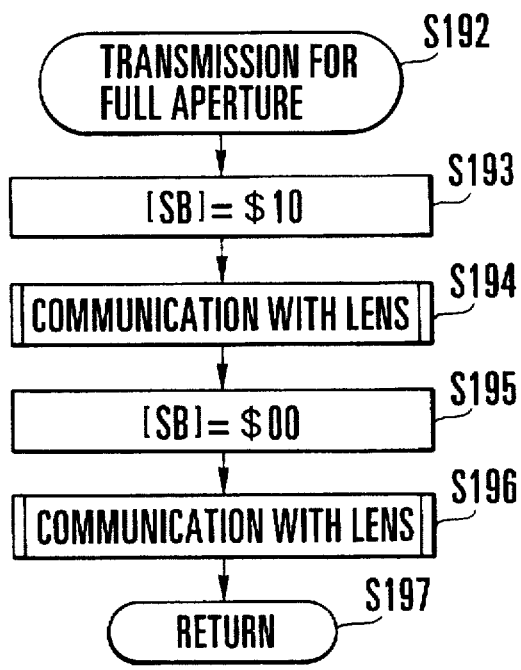
Figure 11C:
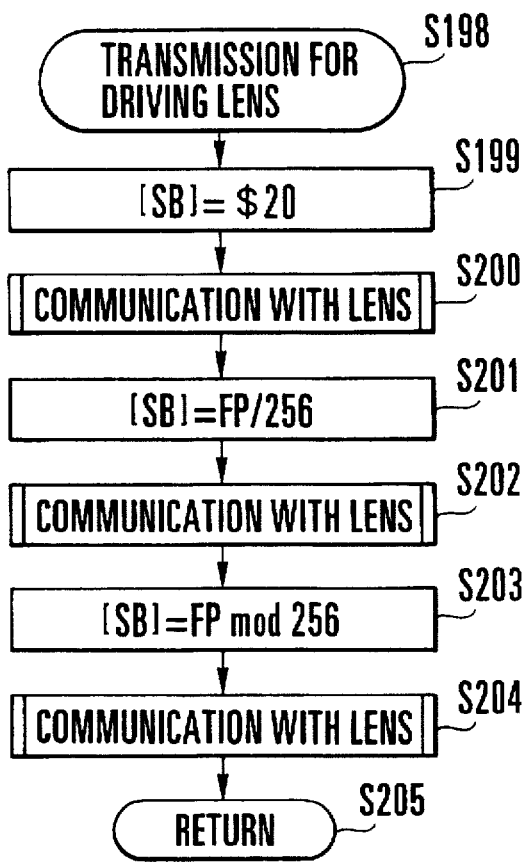

FIGS. 11(A), 11(B) and 11(C) are flow charts showing subroutines to be called also at steps of the flow charts shown in FIGS. 6 and 7.

Figure 12A:
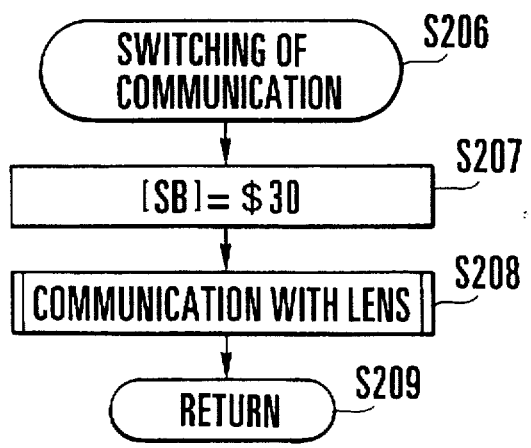
Figure 12B:
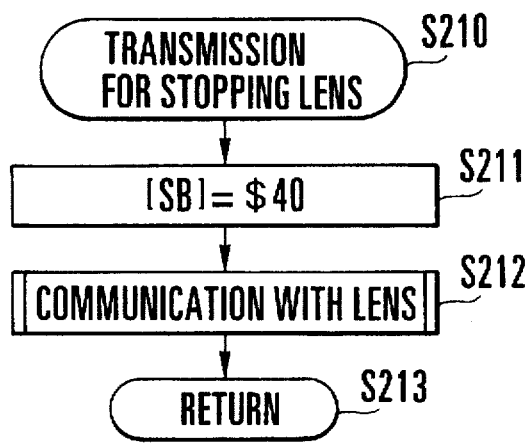
Figure 12C:
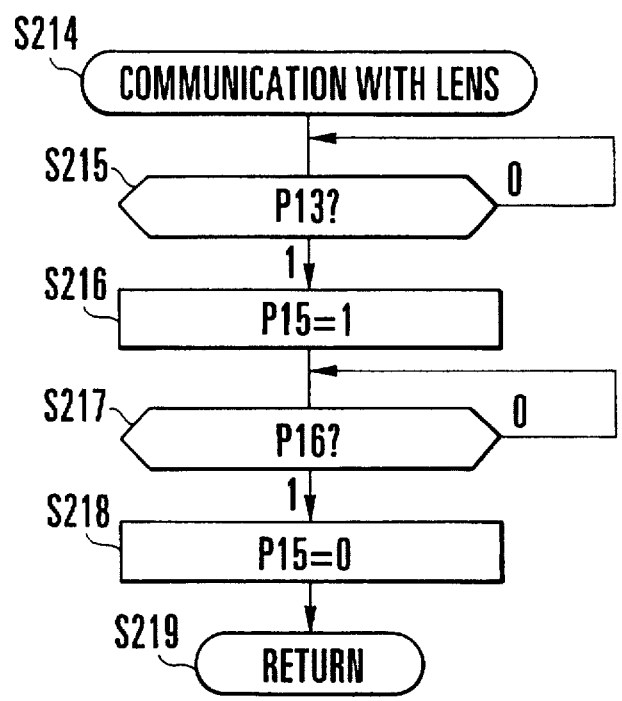

FIGS. 12(A), 12(B) and 12(C) are flow charts showing subroutines to be called also at steps of the flow charts shown in FIGS. 6 and 7.

Figure 13:
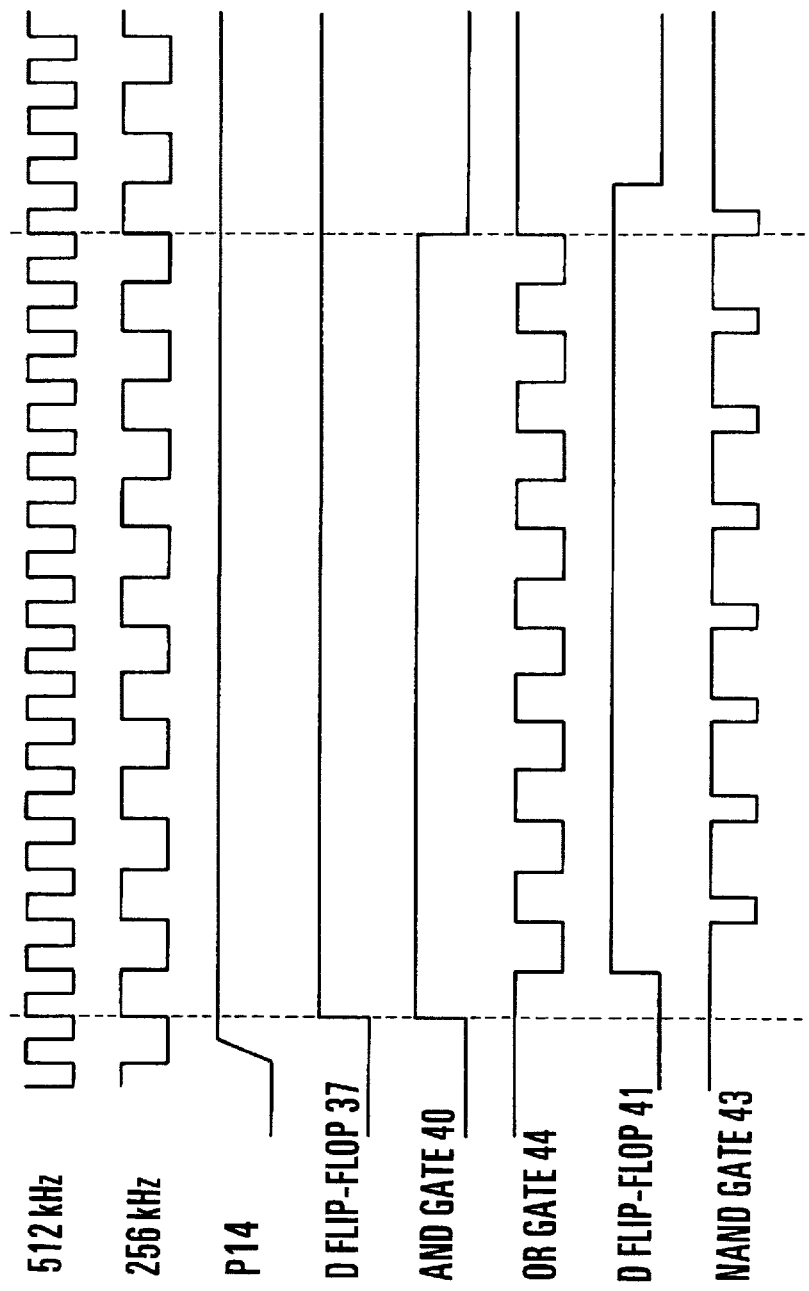

FIG. 13 is a timing chart showing various signals obtained in the embodiment of this invention.

Figure 14:
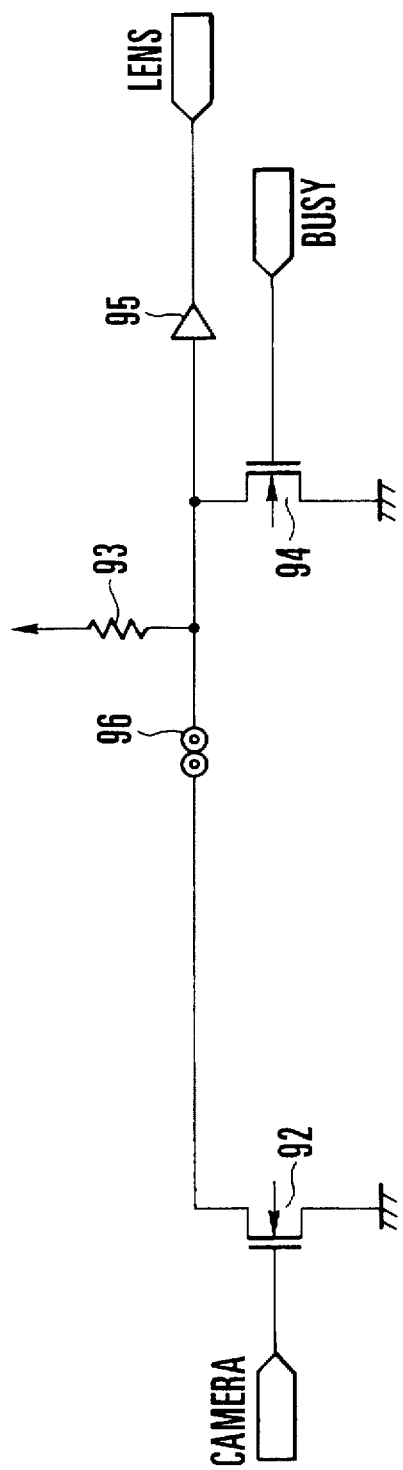

FIG. 14 is a circuit diagram showing an example for explaining the conventional connection for communication between a camera and a lens.

FIGS. 15(A) and 15(B) are timing charts for explaining a problem caused by the arrangement shown in FIG. 14.

Figure 16:
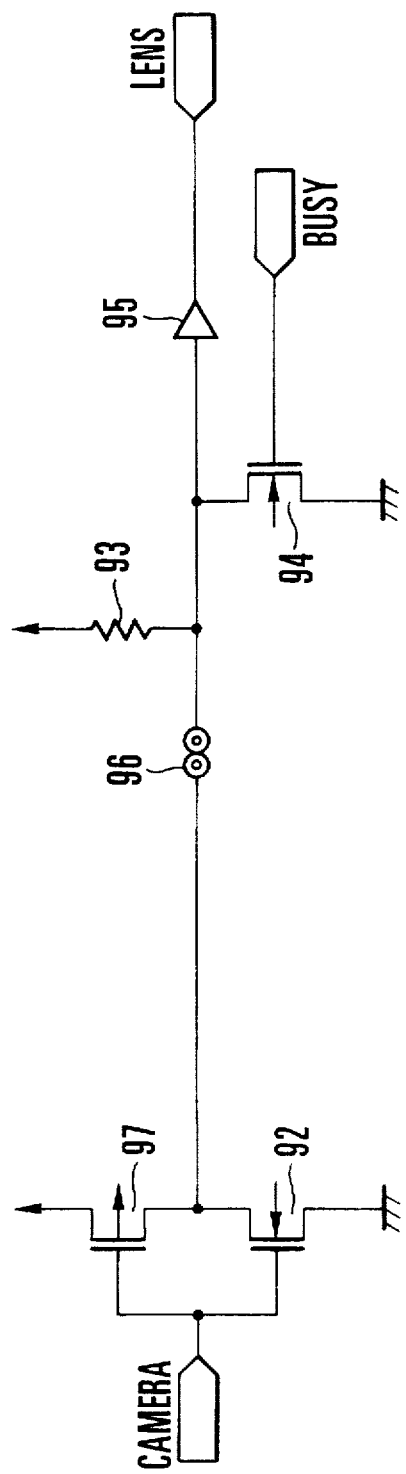

FIG. 16 is a circuit diagram showing another example for explaining the conventional connection for communication between a camera and a lens.

DETAILED DESCRIPTION OF THE INVENTION

Hereinafter, a preferred embodiment of this invention will be described in detail with reference to the accompanying drawings.

Figure 1:
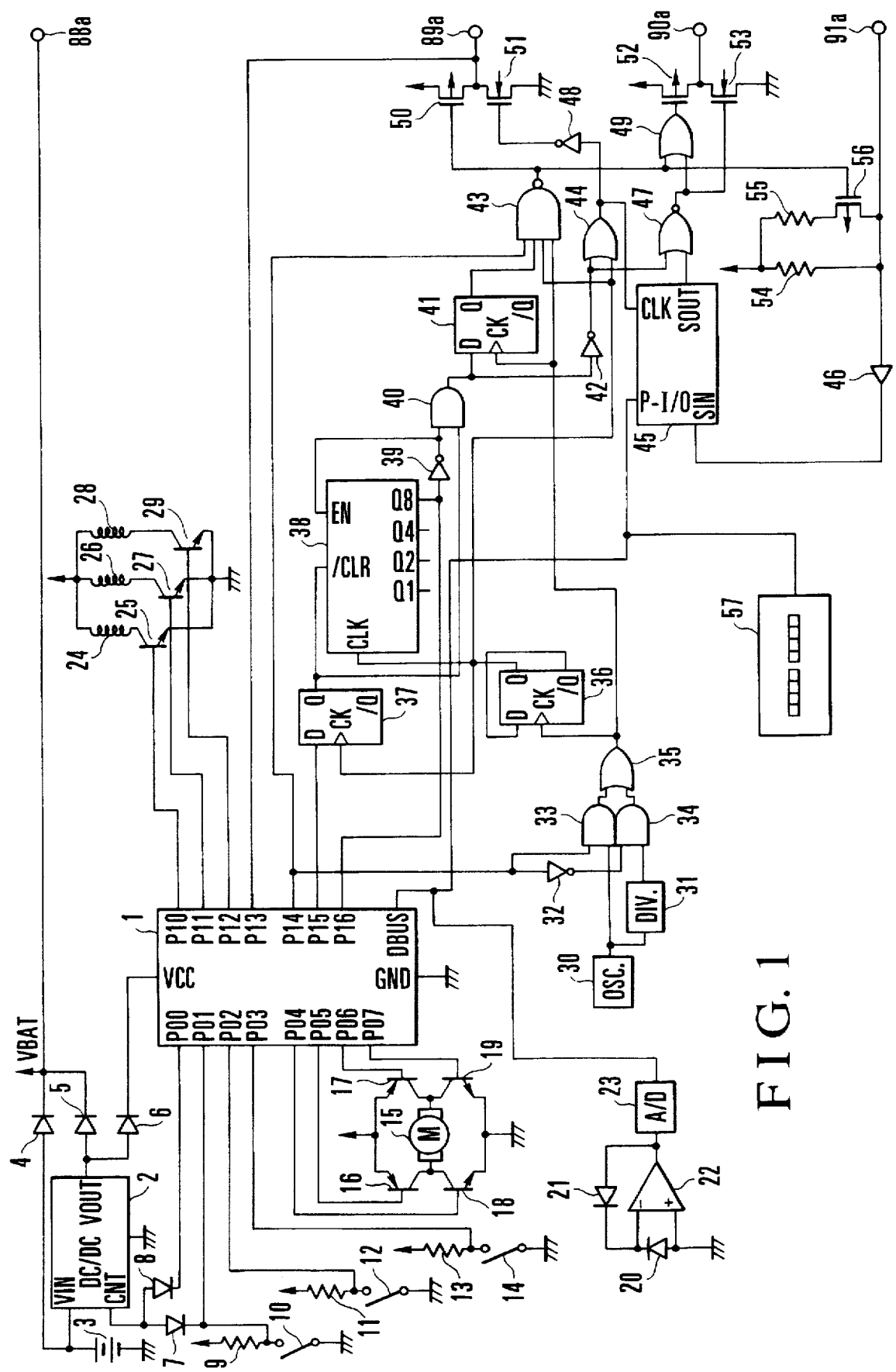
FIG. 1 is a circuit diagram showing the arrangement of essential parts disposed on the side of a camera in a camera system arranged as an embodiment of this invention.
Figure 2:
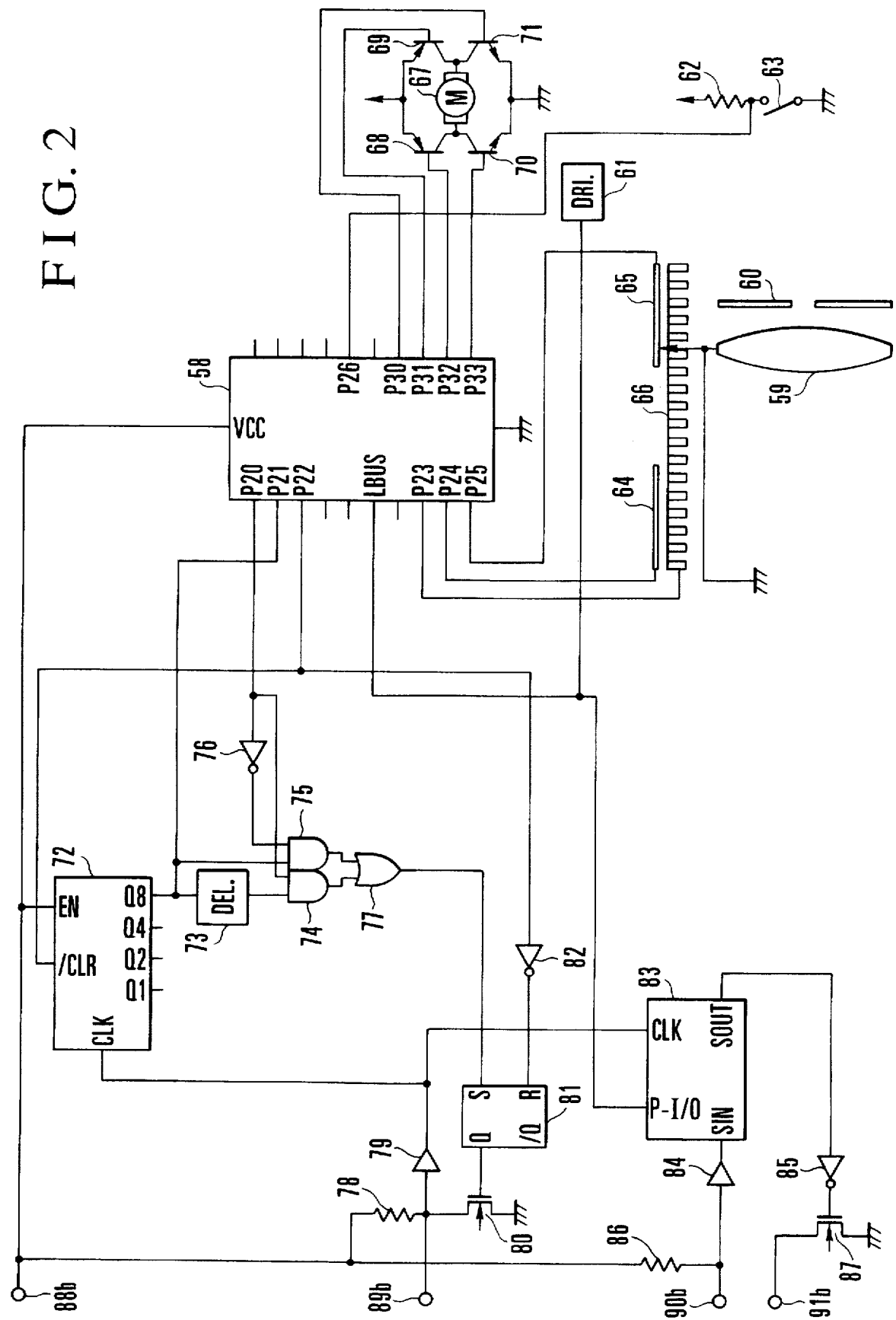
FIG. 2 is a circuit diagram showing the arrangement of essential parts disposed on the side of a lens in the camera system arranged as the embodiment of this invention.

FIG. 1 is a circuit diagram showing the electrical arrangement of a camera in a camera system arranged as an embodiment of this invention. FIG. 2 is a circuit diagram showing the electrical arrangement of a lens to be mounted on the camera shown in FIG. 1.

The electrical arrangement of the camera is first described.

Referring to FIG. 1, a microcomputer 1 which is provided for control over the camera has output ports P00, P04, P05, P06, P07, P10, P11, P12, P14 and P15, input ports P01, P02, P03, P13 and P16, a power supply terminal VCC, and a ground terminal GND. A data bus DBUS which is disposed within the camera for data of 8 bits is arranged to transfer addresses and data.

A DC/DC converter 2 has an input terminal VIN, an output terminal VOUT and a control terminal CNT. The DC/DC converter 2 is arranged to output a voltage of 5 V from the output terminal VOUT upon receipt of a low-level signal at the control terminal CNT. The output voltage becomes 0 V when a high-level signal is received at the control terminal CNT. The camera is provided with a battery 3 and diodes 4 and 5. An upward arrow shown in FIG. 1 indicates a power supply VBAT. Either the voltage of the battery 3 or that of the DC/DC converter 2 whichever is higher is selected and outputted by the diodes 4 and 5.

A diode 6 is arranged to supply the output of the DC/DC converter 2 to the camera control microcomputer 1. Diodes 7 and 8 are arranged to form a wired OR circuit for the output port P00 of the camera control microcomputer 1 and a release first switch 10, which is arranged to be turned on by a first stroke of operation of a shutter release button which is not shown. A pull-up resistor 9 is connected to the power supply VBAT.

4

The camera further includes a pull-up resistor 11, a release second switch 12 which is arranged to be turned on by a second stroke of operation of the shutter release button, a pull-up resistor 13, a film winding completion switch 14 which is arranged to turn on upon completion of film winding, and a shutter-charging and film-winding motor 15. PNP transistors 16 and 17 and NPN transistors 18 and 19 are arranged to be used for control over the rotation of the motor 15. A photodiode 20 is provided for measuring the luminance of a photographing object. A diode 21 is provided for logarithmic compression. An operational amplifier 22 is arranged to convert a current representing the luminance measured by the photodiode 20 into a logarithmically compressed voltage. An A/D converter 23 is connected to the data bus DBUS of the camera control microcomputer 1 and is arranged to transfer data which has been A/D (analog-to-digital) converted according to an address signal.

An electromagnet 24 is arranged to release the shutter of the camera from a clamped state. The camera further includes an NPN transistor 25, an electromagnet 26 for a leading shutter curtain, an NPN transistor 27, an electromagnet 28 for a trailing shutter curtain, an NPN transistor 29, an oscillator 30 which is arranged to oscillate clock pulses at 512 kHz, a frequency divider 31 for dividing the frequency of the clock pulses by four, an inverter 32, AND gates 33 and 34, an OR gate 35, and D flip-flops 36 and 37.

A counter 38 is arranged to count clock pulses inputted from a clock terminal CLK and to output a binary value. At the counter 38, a first place of the binary value is outputted from a terminal Q1, a second place of the binary value is outputted from a terminal Q2, a fourth place of the binary value is outputted from a terminal Q4, and an eighth place of the binary value is outputted from a terminal Q8. A terminal /CLR of the counter 38 is arranged to clear the counting of the clock pulses upon receipt of a low-level signal input. A terminal EN of the counter 38 is arranged to inhibit the counting of the clock pulses upon receipt of a low-level signal input and to permit the counting of the clock pulses upon receipt of a high-level signal input. In other words, the levels of all the terminals Q1, Q2, Q4 and Q8 become low when the terminal /CLR is at "0". When the terminals /CLR and EN both become "1" (/CLR=1 and EN=1), the counter 38 counts the rise edges of the clock pulses at the terminal CLK. Then, the binary output of the count value thus obtained appears at the terminals Q1, Q2, Q4 and Q8. Therefore, the state of the terminal Q8 becomes "1" when eight clock pulses are counted by the counter 38.

The camera further includes an inverter 39, an AND gate 40, a D flip-flop 41, an inverter 42, a NAND gate 43, and an OR gate 44.

A shift register 45 is connected to the data bus DBUS of the camera control microcomputer 1 and is arranged to send and receive parallel data of 8 bits according to an address signal. At the shift register 45, the data received is stored by an internal register. The data stored is shifted by one bit, one after another, by the edge of rise of a terminal CLK and is outputted from an output terminal SOUT. At the same time, data received at an input terminal SIN is latched by the edge of fall of the terminal CLK and is taken into an internal register by one bit, at a time, one after another.

The camera further includes a buffer 46, a NOR gate 47, an inverter 48, and an OR gate 49. A PMOS gate 50 is arranged to turn on when a low-level signal is inputted to the gate and to turn off when a high-level signal is inputted. An NMOS gate 51 is arranged to turn off when a low-level signal is inputted to the gate and to turn on when a high-level signal is inputted.

The camera also includes a PMOS gate 52, an NMOS gate 53, pull-up resistors 54 and 55, and a PMOS gate 56. A CCD 57 which is provided for measuring a distance to an object to be photographed is connected to the data bus DBUS of the camera control microcomputer 1 and is thus arranged to transfer parallel data of 8 bits according to an address signal.

The electrical arrangement of the lens is next described.

Referring to FIG. 2, a lens control microcomputer 58 is disposed within the lens for control over the actions of the lens. The lens control microcomputer 58 is provided with output ports P20, P22, P30, P31, P32 and P33, input ports P21, P23, P24, P25 and P26, and a data bus LBUS of eight bits which is arranged to transfer addresses and data.

In FIG. 2, reference numeral 59 denotes a photo-taking lens, and reference numeral 60 denotes a diaphragm. A diaphragm driving circuit 61 is arranged to drive the diaphragm 60 to open or close its aperture. Reference numeral 62 denotes a pull-up resistor 62. A diaphragm opening switch 63 is arranged to turn off when the aperture of the diaphragm 60 is opened and to turn on when the aperture is stopped down.

A zone switch 64 is arranged to turn on when the photo-taking lens 59 is set in a position on the side of a nearest distance end. Another zone switch 65 is arranged to turn on when the photo-taking lens 59 is set in a position on the side of an infinity distance end. A comb teeth switch 66 is arranged to turn on and off every time the photo-taking lens 59 moves a distance of one micron.

A distance ring driving motor 67 is arranged to drive the photo-taking lens 59. PNP transistors 68 and 69 and NPN transistors 70 and 71 are provided for control over the distance ring driving motor 67. A counter 72 is arranged in a manner similar to the counter 38. The lens further includes a delay circuit 73, AND gates 74 and 75, an inverter 76, an OR gate 77, a pull-up resistor 78, a buffer 79, an NMOS gate 80, a flip-flop 81, an inverter 82, a shift register 83 which is similar to the shift register 45, a buffer 84, an inverter 85, a pull-up resistor 86, and an NMOS gate 87.

In FIGS. 1 and 2, reference numerals 88 (88a and 88b) to 91 (91a and 91b) denote terminals arranged to electrically connect the camera and the lens to each other.

More specifically, these terminals include power supply terminals 88 (88a and 88b) which are arranged to connect the power supply VBAT thereto, serial clock terminals 89 (89a and 89b) which are provided for transfer of a serial clock signal, camera signal terminals 90 (90a and 90b) which are provided for communication of serial data from the camera to the lens, and lens signal terminals 91 (91a and 91b) which are provided for transferring serial data from the lens to the camera.

In the camera system formed by interconnecting the camera and the lens which are arranged as described above, an operation to be performed on the side of the lens is first described below with reference to FIGS. 3, 4, 5(A) and 5(B) which are flow charts.

In these flow charts, reference symbol A denotes an accumulator for performing an arithmetic operation. Reference symbol LMOV denotes a flag indicating that the distance ring is in process of being driven. Reference symbols FHR and FLR denote registers of 8 bits. Reference symbol [SIB] denotes the shift register 83 arranged to be accessed through the data bus LBUS. Reference symbol [EMD] denotes the diaphragm driving circuit 61 arranged also to be accessed through the data bus LBUS. Reference symbol $ denotes a sign indicative of the hexadecimal notation.

With the battery 3 (see FIG. 1) turned on, power is supplied to the lens control microcomputer 58 through the diode 4 and the power supply terminal 88 shown in FIG. 1. The lens control microcomputer 58 then begins to perform a reset action at a step S2 through a step S1.

At the step S2, the output ports of the lens control microcomputer 58 are initialized. To be more specific, the port P20 is set at "0", the port P31 at "1", the port P32 at "1", the port P30 at "0" and the port P33 at "0". The lens control microcomputer 58 also clears the distance ring driving in-process flag LMOV. With the output port P20 set at "0", the level of the output of the inverter 76 becomes high to select the AND gate 75 from between the two AND gates 74 and 75. With the output port P31 set at "1", the PNP transistor 69 turns off. With the output port P32 set at "1", the PNP transistor 68 turns off. With the output port P30 set at "0", the NPN transistor 71 turns off. With the output port P33 set at "1", the NPN transistor 70 turns off to allow no current to flow to the motor 67.

At the next step S3, the lens control microcomputer 58 transfers data "$00" to the shift register 83, i.e., [SIB], via the data bus LBUS. At a step S4, a subroutine for communication with the camera is called. The subroutine for communication with the camera is described below with reference to FIG. 5(A) which is a flow chart.

Figure 5:
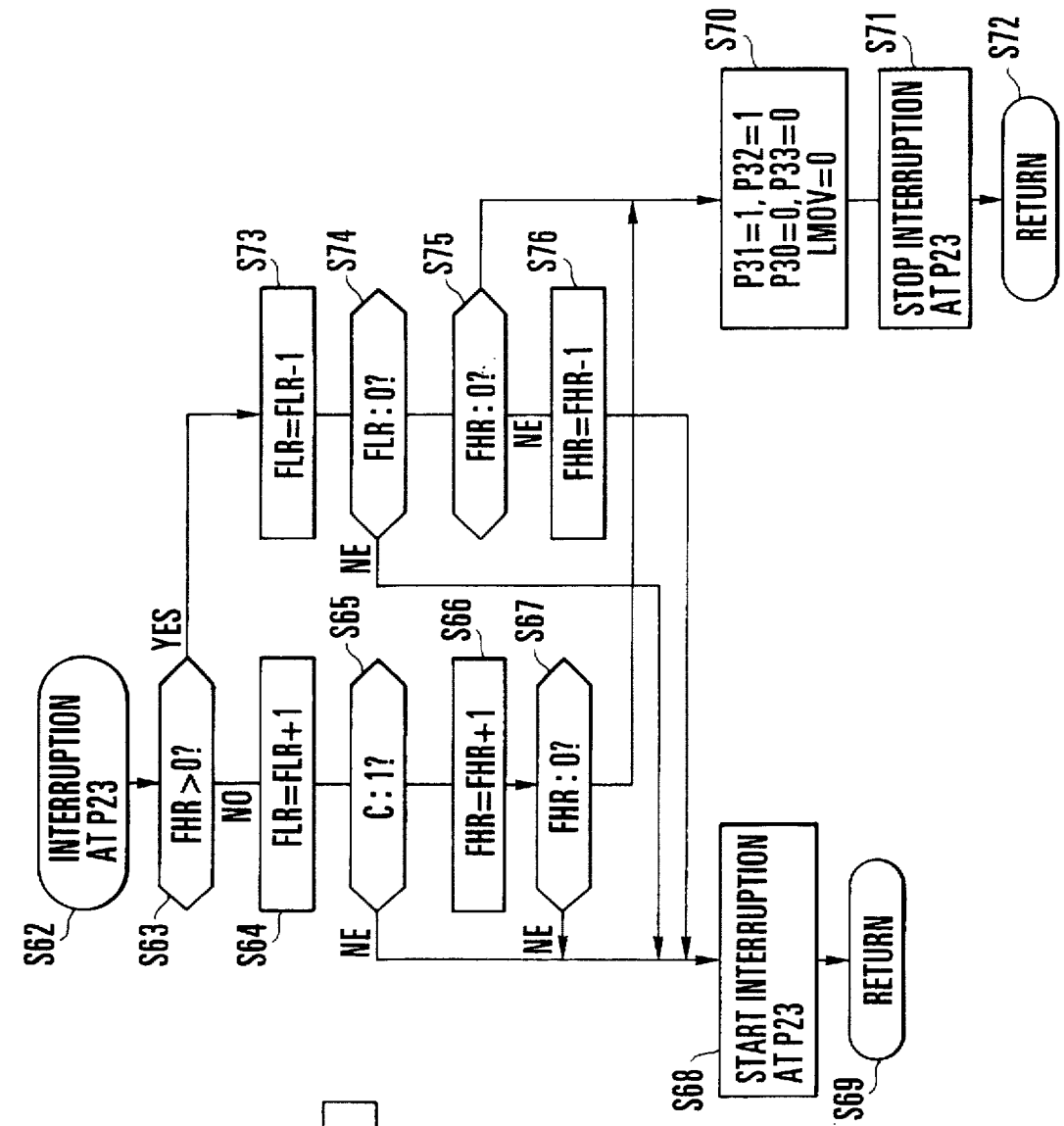
FIGS. 5(A) and 5(B) are flow charts showing subroutines to be called at steps of the flow charts shown in FIGS. 3 and 4.

The subroutine for communication with the camera begins at a step S58 through a step S57 in FIG. 5(A).

At the step S58, a signal "0" is outputted from the port P22 to reset the counter 72 and also to reset the RS flip-flop 81 through the inverter 82. At the next step S59, a signal "1" is outputted from the port P22 to release the counter 72 and the RS flip-flop 81 from their reset states. At a step S60, the flow of operation waits in a looping manner until the level of the port P21 becomes high.

When clock pulses are sent from the camera via the serial clock terminal 89, the clock pulses enter the counter 72 via the buffer 79 to be counted by the counter 72. Further, data is outputted from the camera via the signal terminal 90 by one bit at a time in synchronism with the serial clock pulses. The data from the camera is taken in the shift register 83 in synchronism with the serial clock pulses. At the same time, the shift register 83 outputs, by one bit at a time in synchronism with the serial clock pulses, the data which is set at the step S3 and is to be sent to the camera. The data from the shift register 83 is inverted by the inverter 85 and again inverted by the NMOS gate 87 before it is supplied to the camera via the signal terminal 91.

With the serial clock pulses of 8 bits outputted, the counter 72 outputs a high-level signal from its terminal Q8 to set the RS flip-flop 81 via the AND gate 75 selected at the step S2 and via the OR gate 77. The level of the output of the RS flip-flop 81 is, therefore, inverted to a high level to turn on the NMOS gate 80. As a result, the level of the serial clock terminal 89 becomes low to inform the camera that the lens is in a busy state.

Figure 3:
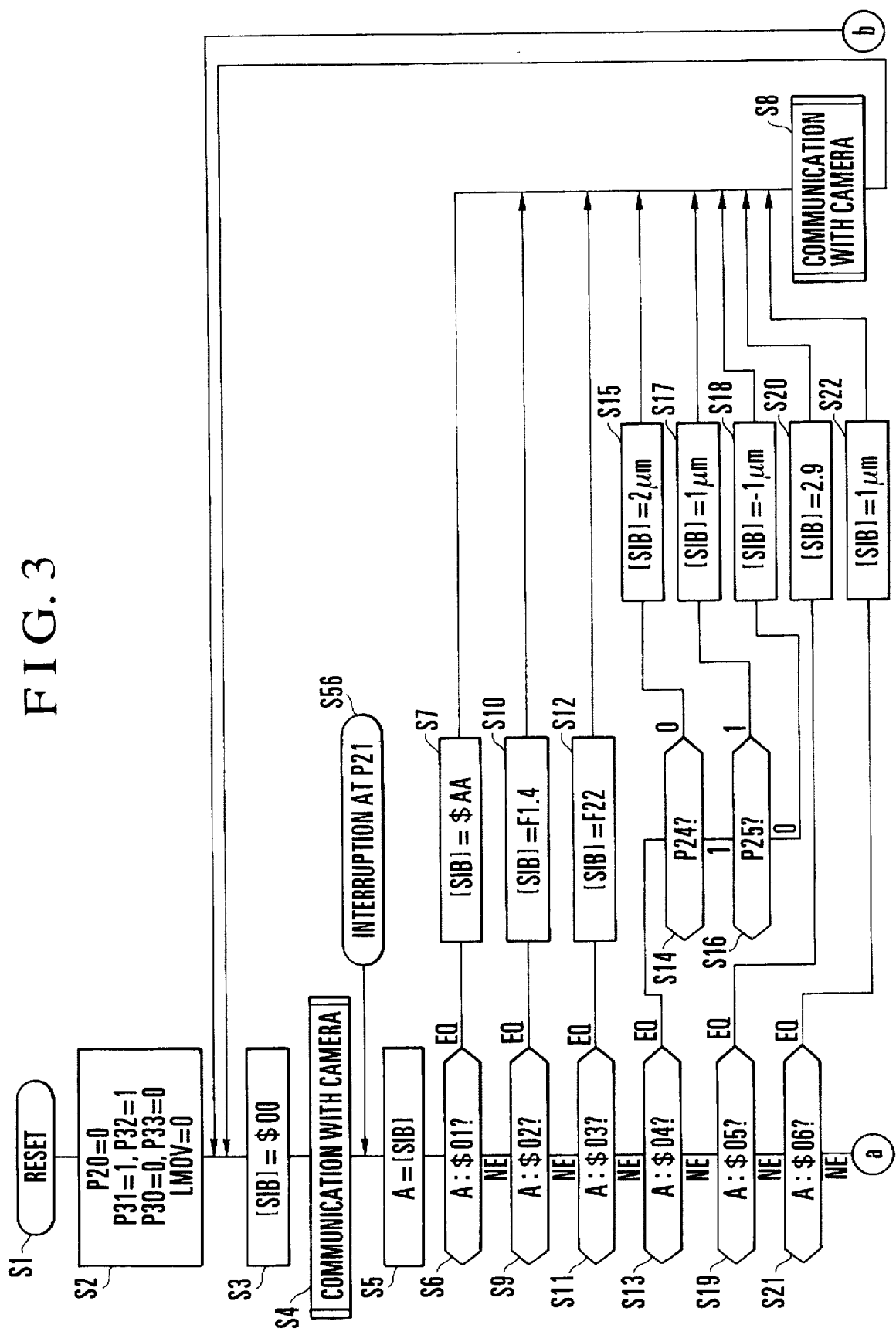
FIG. 3 is a flow chart showing in part a control operation of a lens control microcomputer shown in FIG. 2.

Further, since the level of the output of the counter 72 applied to the port P21 also becomes high, the flow of operation of the lens control microcomputer 58 proceeds to a step S61 to return from the subroutine of FIG. 5(A) to the main routine of FIG. 3.

The flow of operation described above enables the lens to send and receive serial data of 8 bits to and from the camera.

At a step S5 shown in FIG. 3, the lens control microcomputer 58 reads data out from the shift register 83 via the data bus LBUS and sends it to the accumulator A. The data received via the data bus LBUS is considered to be a command for discriminating the contents of communication from the camera. At the next step S6, a check is made to find if the command from the camera is equal to a value "$01". If so, the flow proceeds to a step S7. If not, the flow proceeds to a step S9.

At the step S7, since the data from the camera is a command to confirm communication with the lens when its value is "$01", data "$AA" is transferred to the shift register 83. This data commonly applies to any of interchangeable lenses. At the next step S8, the subroutine for communication with the camera, which is shown in FIG. 5(A), is called.

At the step S58 of the subroutine for communication with the camera, the NMOS gate 80 is turned off as the RS flip-flop 81 is reset. Then, the serial clock terminal 89b is pulled up to a high level by the resistor 78 to inform the camera that the busy state is canceled.

Since the camera is expected to start the next communication when the level of the serial clock terminal 89 becomes high, the flow waits for serial communication from the camera. By the above communication, the lens sends the data "$AA" to the camera to let the camera confirm that a communication has been conducted with the lens. After that, the flow returns to the step S3 to wait for the next communication with the camera.

At the step S9, since the command is found to be not equal to the value "$01" at the step S6, a check is made to find if the command is equal to another value "$02". If so, the flow proceeds to a step S10. If not, the flow proceeds to a step S11.

At the step S10, since the command from the camera which is at "$02" is a request for information on a full open aperture value, the information on the full open aperture value which is, for example, F1.4 is transferred to the shift register 83. Unlike at the step S7, this data is defined for each specific interchangeable lens and does not apply to interchangeable lenses in common. After the step S10, the flow proceeds to the step S8 to send the information on the full open aperture value to the camera. The flow then returns to the step S3 to wait for the next command.

At the step S31, a check is made to find if the command from the camera is equal to a value "$03", which means a request for a minimum-diameter aperture value. If so, the flow proceeds to a step S12. At the step S12, information on the minimum-diameter aperture value which is, for example, F22 is transferred to the shift register 83. The flow then proceeds from the step S12 to the step S8 to transfer the information on the minimum-diameter aperture value to the camera. The flow then returns to the step S3 to wait for the next command.

If the command from the camera is found to be not equal to the value "$03" at the step S11, the flow proceeds to a step S13. At the step S13, a check is made to find if the command from the camera is equal to a value "$04", which means a command to read out a best focus correction value. If so, the flow proceeds to a step S14. The best focus correction value is a parameter for correcting the deviation of an actual focusing position from the amount of defocus measured by the camera. The best focus correction value thus varies with the driven position of the lens.

At the step S14, a check is made to find if the port P24 is at "0" thus indicating that the lens 59 is in a position on the side of the nearest distance end. If so, flow proceeds to a step S15. At the step S15, if correction by +2 microns is necessary on the side of the nearest distance end, for example, data for "2 μm" is stored at the shift register 83 and, after that, is sent to the camera at the next step S8. If the port P24 is found not at "0", the flow proceeds to a step S16.

At the step S16, a check is made to find if the port P25 is at "0" thus indicating that the lens 59 is in a position on the side of the infinity distance end. If so, the flow proceeds to a step S18. If not, the lens 59 is located in an intermediate position and, in that case, the flow proceeds to a step S17.

At the step S17, if correction by +1 micron is necessary in the intermediate position, for example, data for "1 μm" is stored at the shift resister 83 and, after that, is sent to the camera at the next step S8.

Further, at the step S18, if correction by −1 micron is necessary on the side of the infinity distance end, for example, data for "−1 μm" is stored at the shift register 83 and, after that, is sent to the camera at the step S8.

By virtue of the steps S14 to S18, the best (most apposite) focus correction value can be sent to the camera in the manner as described above.

At a step S19, a check is made to find if the command from the camera is equal to a value "$05", which is a command to read the sensitivity of the lens. If so, the flow proceeds to a step S20. The lens sensitivity is a parameter which indicates the relation of an amount of defocus to an amount of movement of the lens. At the step S20, data for the lens sensitivity, for example, 2.9, is transferred to the shift register 83 and, after that, is sent to the camera at the step S8.

At a step S21, a check is made to find if the command from the camera is equal to a value "$06", which is a command to read out a comb teeth pitch. If so, the flow proceeds to a step S22. The comb teeth pitch is a parameter of an amount of movement of the lens corresponding to one tooth of the comb teeth switch 66. At the step S22, if the comb teeth pitch is 1 μm, for example, data for "1 μm" is transferred to the shift register 83 and, after that, is sent to the camera at the next step S8.

Figure 4:
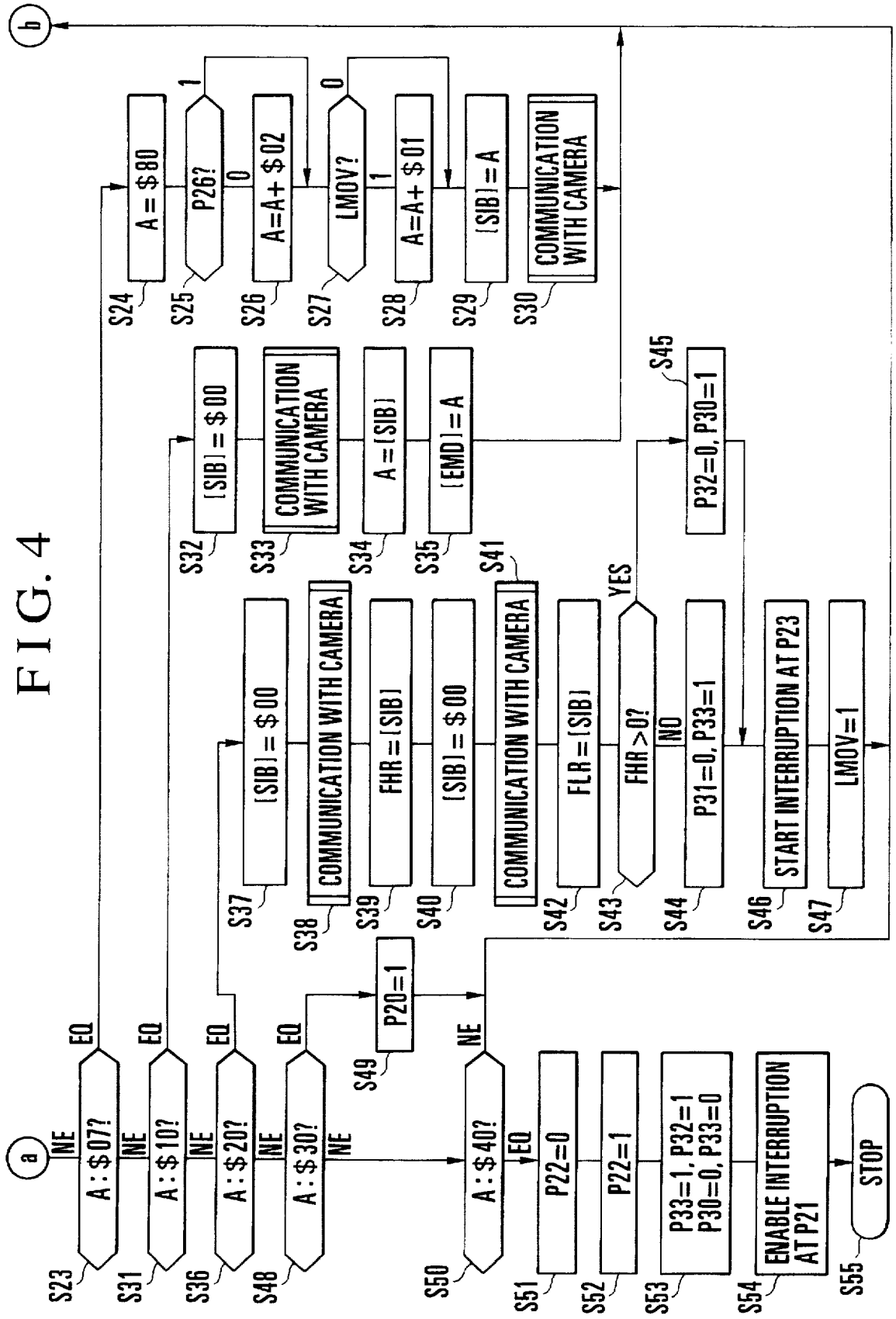
FIG. 4 is a flow chart showing the operation of the lens control microcomputer as continuing from FIG. 3.

At a step S23 shown in FIG. 4, a check is made to find if the command from the camera is equal to a value "$07", which is a command to read out the state of the lens. If so, the flow proceeds to a step S24. At the step S24, the value "$80" is stored at the accumulator A. The bit 7 is a bit associated with high speed communication and, since the lens in this embodiment is arranged to permit high speed communication, the value "$80" is set. In the event of the conventional lens which is not arranged to permit high speed communication, "0" is set for the lens.

At a step S25, a check is made for the state of the port P26. If the port P26 is found to be at "0" with the diaphragm opening switch 63 tuned on, the flow proceeds to a step S26. If not, the flow proceeds to a step S27.

At the step S26, "$02" is added to the accumulator A. Thus, the bit 1 is set at "1" to inform the camera of a stopped-down state of the diaphragm. If the diaphragm is full open, the bit 1 is set at "0" at the step S24.

At the next step S27, a check is made for the state of the distance ring driving in-process flag LMOV. The flow proceeds to a step S28 if the flag LMOV is found to be at "1" or to a step S29 if the flag LMOV is found to be at "0".

At the step S28, "1" is added to the accumulator A, so that the camera is informed that the distance ring is in process of driving. At the next step S29, the content of the accumulator A is transferred to the shift register 83. At a step S30, the subroutine for communication with the camera shown in FIG. 5(A) is called to send information on the state of the lens to the camera.

The flow then returns to the step S3 to wait for arrival of the next command from the camera.

Further, at a step S31, a check is made to find if the command from the camera is equal to a value "$10" which indicates a command to drive the diaphragm. If so, the flow proceeds to a step S32. At the step S32, "$00" is transferred to the shift register 83. At the next step S33, the subroutine for communication with the camera is called to wait for arrival of data from the camera.

In the case of the diaphragm driving command mentioned above, an aperture stopping-down value of one byte is received from the camera. The aperture stopping-down value is defined to indicate a full-open aperture when it is at "0" and to indicate the value of one step in stopping down by eight steps.

At the next step S34, the stopping-down amount received from the camera is taken in the accumulator A. At a step S35, the data is transferred to the diaphragm driving circuit 61 via the data bus LBUS of the lens control microcomputer 58.

The diaphragm driving circuit 61 drives the diaphragm 60 to an extent corresponding to the number of steps indicated by the data received. For example, if the value is "$10" in the hexadecimal notation and "16" in the decimal notation, the aperture of the diaphragm is stopped down from its full open position F1.4 by two steps to obtain an aperture value of F2.8. In a case where the driving command of "$00" is received when the aperture is in the stopped-down position of the aperture value F2.8, the aperture of the diaphragm 60 is brought back to its full open position. After the diaphragm 60 is driven in this manner, the flow returns to the step S3 to wait for arrival of the next command from the camera.

At a step S36, the command from the camera is checked to find if it is "$20", which is for driving the distance ring. If so, the flow proceeds to a step S37. In the case of the distance ring driving command, coded data of two bytes are received from the camera. At the step S37, data of "$00" is transferred to the shift register 83. At a step S38, the subroutine for communication with the camera is called to wait for arrival of data from the camera.

At the next step S39, data received for the first time from the camera is stored in the register FHR. At a step S40, data of "$00" is transferred to the shift register 83. At a step S41, the subroutine for communication with the camera is called to wait for arrival of data from the camera. At a step S42, data received for the second time from the camera is stored in the register FLR.

At the next step S43, the data stored in the register FHR is checked to find if it is of a positive value. If so, the flow proceeds to a step S45. If not, the flow proceeds to a step S44.

At the step S44, the port P31 is set at "0" and the port P33 is set at "1", so that both the PNP transistor 69 and the NPN transistor 70 are turned on to cause the motor 67 to rotate. The lens 59 is then driven by the motor 67 toward the infinity distance end position.

At the step S45, the port P32 is set at "0" and the port P30 at "1", so that both the PNP transistor 68 and the NPN transistor 71 are turned on to cause the motor 67 to rotate in the direction reverse to the direction in which the motor 67 is driven at the step S44. The motor 67 thus moves the lens 59 toward the nearest end position.

At the next step S46, an interruption which takes place when the level of the port P23 changes from a high level to a low level is allowed to start. After that, the control over the motor 67 is performed in the subroutine for the interruption at the port P23, as shown in FIG. 5(B). At a step S47, the distance ring driving in-process flag LMOV is set at "1". With the flag LMOV set at "1", when the command from the camera is "$07" which means a request for information on the state of the lens, the bit 0 of the accumulator A is set at "1", so that the camera can be informed that the distance ring is being driven.

After the step S47, the flow returns to the step S3 to wait for arrival of the next command from the camera.

With the lens driving action started at the step S44 or S45 as mentioned above, the lens 59 moves over the pulse generating comb teeth switch 66. The switch 66 turns on and off for a number of times in proportion to the amount of movement of the lens 59. A signal which is thus generated by the switch 66 is supplied to the port P23 to allow the interruption when it turns on from its off-state. The details of this interruption are as described below with reference to the flow chart of FIG. 5(B).

Referring to FIG. 5(B), the interruption at the port P23 takes place at a step S62. Then, the process of the main flow of operation is suspended and the process of the interruption at the port P23 begins at the step S63.

At the step S63, a check is made for the data stored in the register FHR. The flow proceeds to a step S73 if the data stored in the register FHR is found to be of a positive value, or to a step S64 if it is found to be of a negative value.

In a case where the data stored in the register FHR is found to be of a negative value, the flow of operation is executed in the following manner.

At the step S64, the value of the register FLR is incremented by one. At a step S65, a check is made to find if the register FLR has overflown. If so, the flow proceeds to a step S66. If not, the flow proceeds to a step S68.

At the step S66, the value of the register FHR is incremented by one. At the next step S67, a check is made to find if the value of the register FHR has become "0". If so, the flow proceeds to a step S70. If not, the flow proceeds to the step S68.

At the step S68, the interruption at the port P23 is set once again. At the next step S69, the process of the interruption is brought to an end, and the flow returns to the main flow of operation.

In short, the steps S64 to S67 are repeated to increment by one the negative data of 2 bytes every time the port P23 turns on from an off state accordingly as the lens 59 moves. Then, when the data from the camera becomes "0", the flow proceeds to the step S70.

At the step S70, each output port of the lens control microcomputer 58 is set in the same manner as at the step S2 described in the foregoing, and the driving action on the motor 67 is brought to a stop. Further, the distance ring driving in-process flag LMOV is cleared. At the next step S71, the interruption at the port P23 is brought to a stop. At a step S72, the process of the interruption is brought to an end, and the flow returns to the main flow of operation shown in FIG. 4.

The lens 59 thus can be driven in the above-stated manner to move toward the nearest distance end position to an extent which corresponds to a number of comb teeth pulses as indicated by the camera.

Steps to be executed in a case where the data stored in the register FHR is found to be of a positive value is next described.

At the step S73, the value of the register FLR is decremented by one. At the next step S74, a check is made to find if the value of the register FLR is "0". If not, the flow proceeds to the step S68 to allow the interruption to be carried on.

At a step S75, a check is made to find if the value of the register FHR is "0". If not, the flow proceeds to a step S76. Meanwhile, if the values of both the registers FHR and FLR are "0", the flow proceeds to the step S70 to b ring the motor 67 to a stop and also to bring a driving action on the distance ring to a stop.

At the step S76, the value of the register FHR is decremented by one. The flow then proceeds to the step S68 to allow the interruption to be carried on.

In short, the steps S73 to S76 are repeated to decrement by one the positive data of 2 bytes every time the port P23 turns on from an off-state accordingly as the lens 59 moves. Then, when the data from the camera becomes "0", the flow proceeds to the step S70.

The lens 59 thus can be driven in the above-stated manner to move toward the infinity distance end position to an extent which corresponds to a number of comb teeth pulses as indicated by the camera.

After the step S70, the flow proceeds to the step S71 to bring the interruption at the port P23 to a stop. At the step S72, the flow returns to the main routine from the subroutine of the interruption at the port P23.

Referring again to FIG. 4, a check is made at a step S48 to find if the command from the camera is "$30", which is for change-over of communication speed. If so, the flow proceeds to a step S49 to set the port P20 at "1". With the port P20 set at "1", the AND gate 74 is enabled, while the AND gate 75 is disabled.

At the time of completion of communication, a delayed output of the delay circuit 73 is used as a signal for setting the RS flip-flop 81. The delayed output is obtained in a manner as described later herein.

At the next step S50, a check is made to find if the data from the camera is "$40", which is a command to bring the lens to a stop. If so, the flow proceeds to a step S51. If not, the flow returns to the step S3 to wait for the next command, as there is no data corresponding to the current command from the camera.

At the step S51, the port P22 is set at "0". At a step S52, the port P22 is set at "1". By this, like at the steps S58 and S59 shown in FIG. 5(A), the counter 72 and the RS flip-flop 81 are cleared.

At the next step S53, the motor 67 is brought to a stop, in the same manner as at the step S2. At a step S54, an interruption at the port P21 is allowed. At a step S55, the lens control microcomputer 58 is stopped from operating.

While the port P21 is at "0", the lens control microcomputer 58 remains stopped from operating. When communication in one byte is newly made from the camera, the level of the port P21 becomes high and the lens control microcomputer 58 begins to operate from a step S56 (see FIG. 3).

At the step S56, the lens control microcomputer 58 begins to operate and the flow proceeds to the step S5. At the step S5, a command is received and the process described in the foregoing is resumed.

The lens control microcomputer 58 operates as described above.

The camera control microcomputer 1 shown in FIG. 1 operates as follows. FIGS. 6 and 7 are flow charts showing the main flow of operation of the camera control microcomputer 1. FIGS. 8(A), 8(B) and 8(C) to FIGS. 12(A), 12(B) and 12(C) are flow charts showing subroutines to be called while the main flow of operation is in process.

In these flow charts, reference symbol A denotes an accumulator which is arranged to perform a computing operation. Reference symbol JFF denotes an in-focus flag indicating that the lens is in an in-focus state. Reference symbol HCOM denotes a flag indicating that the lens mounted on the camera permits high speed communication with the camera. Reference symbol LMOVF denotes a flag indicating that the distance ring is in process of being driven. Reference symbol CLOSEF is a flag indicating that the diaphragm aperture of the lens mounted is in a stopped-down state. Reference symbol BV denotes a register of 8 bits for storing a luminance value of an object to be photographed. Reference symbol EV denotes a register of 8 bits for storing an exposure value for the object. Reference symbol SV denotes a register of 8 bits for storing an ISO sensitivity value of the film in use. Reference symbol AV denotes a register of 8 bits for storing a computed aperture value. Reference symbol TV denotes a register of 8 bits for storing a computed shutter time (speed). Reference symbol AVo denotes a register of 8 bits for storing a full-open aperture value. Reference symbol AVmax denotes a register of 8 bits for storing a minimum-diameter aperture value obtainable by stopping down the diaphragm aperture to a maximum extent. Reference symbol BP denotes a register of 8 bits for storing a best focus correction value. Reference symbol S denotes a register of 8 bits for storing the sensitivity of the lens. Reference symbol PT denotes a register of 8 bits for storing the pitch of comb teeth. Reference symbols DEF and LM denote registers of 16 bits arranged respectively to store an amount of defocus and an amount of driving of the lens. Reference symbol FP denotes a register of 16 bits arranged to store information on a number of driving comb teeth. Reference symbol |SB| denotes the shift register 45 which is arranged to be accessed through the data bus DBUS.

When the operator of the camera pushes to a half extent a shutter release button which is not shown, the release first switch 10 turns on to render the DC/DC converter 2 operative via the diode 7. Then, the voltage of the battery 3 is boosted by the DC/DC converter 2. As a result, power is supplied via the diode 6 to the camera control microcomputer 1, which then starts to execute a flow of operation beginning with a step S72 through a step S71.

At the step S72, the port P00 is set at a low level. By this, the DC/DC converter 2 is turned on through the diode 8, so that the power can be retained even after the release first switch 10 is turned off.

At a step S73, the in-focus flag JFF is cleared. The ports of the camera control microcomputer 1 are set into a state expressed as follows. P10=0, P11=0, P12=0, P04=0, P05=1, P06=1, P07=0, P14=0. With the ports P10, P11 and P12 set at "0", the NPN transistors 25, 27 and 29 respectively turn off. With the ports P05 and P06 set at "1", the PNP transistors 16 and 17 turn off, and with the ports P04 and P07 set at "0", the NPN transistors 18 and 19 turn off, so that both ends of the motor 15 are made open. With the port P14 set at "0", the AND gate 33 is disabled and the AND gate 34 is enabled via the inverter 32. Further, the NAND gate 43 is disabled.

At the next step S74, a subroutine for checking the lens, which is shown in FIG. 8(A), is called. Referring to FIG. 8(A), the subroutine for checking the lens begins at a step S129 through a step S128.

At the step S129, data "$01" is transferred to the shift register 45 via the data bus DBUS. At the next step S130, a subroutine for communication with the lens, which is shown in FIG. 12(C), is called. Referring to FIG. 12(C), the subroutine for communication with the lens begins at a step S215 through a step S214.

At the step S215 shown in FIG. 12(C), a check is made for the state of the port P13. The flow remains at the step S215 until the level of the port P13 becomes a high level.

The lens control microcomputer 58 performs its control beginning with a reset action and waits for the communication of commands by looping (repeating) the step S60 (see FIG. 5(A)) within the subroutine for communication with the camera called at the step S4 in FIG. 3. Since the RS flip-flop 81 has been reset at the preceding step S58, the NMOS gate 80 is in an off-state. The serial clock terminal 89b is thus in a state of having been pulled up by the resistor 78. The level of the serial clock terminal 89a is, therefore, also high, so that the flow proceeds from the step S215 to a step S216.

Since the port P14 is now at "0", the output of 512 kHz of the oscillator 30 is frequency-divided by four by the frequency divider 31 and is thus made into a clock signal of 128 kHz. The frequency-divided output of the frequency divider 31 is supplied via the AND gate 34 and the OR gate 35 to the D flip-flops 36 and 41 and the NAND gate 43. The clock signal is further frequency-divided by two by the D flip-flop 36 and is then supplied to the D flip-flop 37. When the output of the port P15 is at "0", the output of the D flip-flop 37 is also at a low level. Therefore, the counter 38 is in a cleared state, so that each of its terminals Q1, Q2, Q4 and Q8 outputs "0" to cause the level of the output of the inverter 39 to become high. Further, since the output of the D flip-flop 37 is at "0", the AND gate 40 outputs "0". The output of the inverter 42 is at "1". The output of the OR gate 44 is also at "1". The output of the inverter 48 is at "0". Therefore, the NMOS gate 51 is in an off-state.

Further, since the port P14 is at "0", the NAND gate 43 outputs "1". The OR gate 49 also outputs "1". The PMOS gates 50, 52 and 56 are in an off-state. Since the output of the NOR gate 47 is also at "0", the NMOS gate 53 is in an off-state. At that moment, the serial clock terminal 89 and the camera signal terminal 90 are in a state of having been pulled up by the pull-up resistors 78 and 86 of the lens.

At the step S216, "1" is outputted from the port P15 to cause the level of the input of the D flip-flop 37 to become high. Then, in synchronism with the clock signal of 64 kHz, the level of the output of the D flip-flop 37 also becomes high. As a result, the cleared state of the counter 38 is canceled to cause the counter 38 to begin counting the pulses of the clock signal. However, since the counter 38 has been in the cleared state, its terminal Q8 is still at "0", so that the output of the AND gate 40 becomes "1".

Then, the output of the inverter 42 becomes "0". The OR gate 44, therefore, outputs the clock signal of 64 kHz. The output of the OR gate 44 is inverted by the inverter 48. Thus, the NMOS gate 51 turns on when the clock signal of 64 kHz is at a low level. Therefore, the serial clock terminal 89 is short-circuited to the ground when the clock signal of 64 kHz is at the low level. When the clock signal of the 64 kHz is at its high level, both the PMOS gate 50 and the NMOS gate 51 are turned off, so that the serial clock terminal 89 is pulled up by the pull-up resistor 78 to a high level. Therefore, the clock signal of 64 kHz can be transferred to the lens by the open drain method.

Meanwhile, the clock signal of 64 kHz from the OR gate 44 enters the shift register 45 to cause the data of 8 bits stored there to be outputted, by one bit at a time, from the terminal SOUT of the shift register 45. Since the output of the inverter 42 is at "0", the NOR gate 47 outputs values obtained by inverting the serial data. The NMOS gate 53 turns on when the serial data is at a low level and turns off when the serial data is at a high level. When the serial data is at the high level, both the PMOS gate 52 and the NMOS gate 53 are in a off-state, so that the camera signal terminal 90 is pulled up to a high level by the pull-up resistor 86. The serial data thus can be supplied in synchronism with the clock signal of 64 kHz to the camera signal terminal 90 by the open drain method.

In the lens, the clock signal coming from the serial clock terminal 89 is supplied to the shift register 83 through the buffer 79. The shift register 83 of the lens is arranged to shift data of 8 bits in synchronism with the clock signal and thus takes in the serial data coming from the camera through the buffer 84. The shift register 83 is arranged also to output lens data from its output terminal SOUT. The lens data is supplied to the lens signal terminal 91 through the inverter 85 and the NMOS gate 87.

In the camera, serial data from the lens is supplied to the input terminal SIN of the shift register 45 through the buffer 46.

At the next step S217, the flow of operation waits until the state of the terminal Q8 of the counter 38 becomes "1". The output from the terminal Q8 of the counter 38 changes to "1" when 8 pulses of the clock signal of 64 kHz are counted. As a result, the output of the AND gate 40 becomes "0". The output of the inverter 42 becomes "1". The output of the OR gate 44 then stops transferring the clock signal and becomes "1". The NMOS gates 51 and 53 are turned off through the inverter 48 and the NOR gate 47. At this time, the supply of the clock signal of 64 kHz comes to a stop after 8 pulses of the clock signal are supplied through the serial clock terminal 89. The data of 8 bits of the shift register 45 of the camera and the data of 8 bits of the shift register 83 of the lens are thus exchanged.

In the above-described manner, the arrangement of the embodiment permits communication to be carried out between the lens and the camera in the same manner as the conventional open drain method.

In this instance, since data "$01" has been previously stored in the shift register 45 of the camera, the data "$01" has been transferred to the shift register 83 of the lens as a result. In the lens, the counter 72 counts clock pulses of 64 kHz and outputs "1" from its terminal Q8 upon receipt of the eighth pulse and, since the port P20 is at "0", the RS flip-flop 81 is set through the AND gate 75 and the OR gate 77. Then, the NMOS gate 80 is turned on to short-circuit the serial clock terminal 89 to the ground.

Since the port P21 is caused to be at a high level at the same time, the flow of operation of the lens control microcomputer 58 proceeds from the step S60 to the step S61. The output of the RS flip-flop 81 remains at "1" until the port P22 outputs "0". The serial clock terminal 89, therefore, also remains at a low level in such a way as to inform the camera control microcomputer 1 that the lens control microcomputer 58 is busy. The lens control microcomputer 58 takes in the data "$01" at the step S5, and then its flow branches from the step S6 to the step S7.

At the next step S218, the port P15 is set at "0" to clear the counter 38. At a step S219, the flow returns from this subroutine to the routine of FIG. 8(A).

At a step S131 in FIG. 8(A), "0" is set at the shift register 45. At a step S132, the subroutine for communication with the lens is called again.

Since the serial clock terminal 89 is at a low level this time, the flow waits at the step S215 until the level of the serial clock terminal 89 becomes high in the subroutine for communication with the lens. After completion of process in the lens, "0" is outputted from the port P22 in the next subroutine for communication with the camera. The level of the serial clock terminal 89a is caused to become high by the pull-up resistor 78 to cancel the busy state. The flow then proceeds to the step S216 for the next serial communication.

The camera thus can be caused to suspend communication while the lens is still in process of processing data.

This time, since the lens control microcomputer 58 has caused the data "$AA" to be set at the shift register 83 at the step S7, the serial communication in one byte brings the data "$AA" into the shift register 45 of the camera.

At the next step S133 in FIG. 8(A), the data received by the shift register 45 is taken into the accumulator A. At a step S134, the flow returns to the main routine shown in FIG. 6.

At a step S75 in FIG. 6, the value of the accumulator A is compared with "$AA".

Since, if the camera can communicate with the lens as mentioned above, the value of the accumulator A is "$AA", the flow proceeds to a step S78. On the other hand, in a case where no lens is mounted on the camera or where the lens control microcomputer 58 is not operative, the accumulator A has data other than "$AA". With no lens mounted, for example, the lens terminal 91 is open and is caused to be at a high level by the pull-up resistor 54. Then, data "$FF" enters the shift register 45. In such a case, the flow branches to a step S76.

Further, in a case where the serial clock terminal 89a happens to be short-circuited to the ground by some accident, for example, the serial clock signal is not transferred to the lens to leave the lens communication terminal 91 either at a high level or at a low level. In that case, the data becomes "$00", and then the flow also branches to the step S76.

At the step S76, "1" is outputted from the port P00 to bring the DC/DC converter 2 to a stop. At a step S77, since the camera system is in an abnormal state, the camera control microcomputer 1 is caused to stop from operating.

At the step S78, a subroutine for reading of the lens state, which is shown in FIG. 10, is called. The subroutine for reading of the lens state begins at a step S171 through a step S170.

At the step S171, [SB], i.e., the shift register 45, is set at "$07". At the next step S172, the data "$07" which is a command to read the lens state is sent out to the lens. At a step S173, [SB] is set at "$00". At a step S174, data of one byte is received from the lens. At a step S175, data of the shift register 45 ([SB]) is taken into the accumulator A.

At the next step S176, a check is made for the bit 0 of the accumulator A, that is, the result of "A&$01" is determined. If the result of the check is "1", the flow proceeds to a step S177. If it is found to be "0", the flow proceeds to a step S178.

At the step S177, the flag LMOVF is set at "1". At the step S178, on the other hand, the flag LMOVF is set at "0".

At the steps S176, S177 and S178, the flag LMOVF is set, in the above-stated manner, according to the state of the bit 1 of the accumulator A. This bit represents information set at the steps S27 and S28 to indicate that the distance ring is in process of driving.

At the next step S179, a check is made for the result of "A&$02". If the result of the check is "1", the flow proceeds to a step S180. If it is "0", the flow proceeds to a step S181.

At the step S180, the flag CLOSEF is set at "1". At the step S181, the flag CLOSEF is set likewise according to information on the bit 1 of the accumulator A. This bit indicates the state of the aperture opening switch 63 set at the steps S25 and S26.

At a step S182, a check is made for the result of "A&$80". If the result of the check is "1", the flow proceeds to a step S183. If it is found to be "0", the flow proceeds to a step S184.

At the step S183, the flag HCOM is set at "1". At the step S184, the flag HCOM is cleared according to information on the bit 7 of the accumulator A. This bit is set at the step S24 to indicate a lens which permits a high speed communication.

At a step S185, the flow returns to the main routine shown in FIG. 6.

Referring again to FIG. 6, at a step S79, a check is made for the state of the flag HCOM. If it is found to be at "1" indicating a lens capable of high speed communication, the flow proceeds to a step S80. If is found to be at "0" thus indicating the conventional lens which does not permit high speed communication, the flow proceeds to a step S82.

At the step S80, a subroutine for switching of communication, which is shown in FIG. 12(A), is called. The subroutine for switching of communication begins at a step S207 through a step S206.

At the step S207, [SB] (shift register 45) is set at "$30". At the next step S208, a command of "$30" is sent to the lens. Upon receipt of the command of "$30", the lens control microcomputer 58 outputs "1" at the port P20 at the step S49 shown in FIG. 4. At a step S209, the flow returns to the main routine shown in FIG. 6.

Referring back to FIG. 6, at a step S81, the camera control microcomputer 1 outputs "1" at the port P14. As a result, the level of the output of the inverter 32 becomes low to enable the AND gate 33. The output of 512 kHz of the oscillator 30 then comes to the D flip-flop 36 through the AND gate 33 and the OR gate 35. Accordingly, the clock rate of the serial communication changes from 64 kHz over to 256 kHz. Further, the NAND gate 43 is enabled.

At the next step S82, a subroutine for reading of the full-open aperture value AVo, which is shown in FIG. 8(B), is called. The subroutine for reading of the full-open aperture value AVo begins at a step S136 through a step S135.

At the step S136, [SB] (shift register 45) is set at "$02". At the next step S137, a command "$02" is sent to the lens.

In this instance, when the port P15 is set at "1" at the step S216 in FIG. 12(C), the D flip-flop 37 is latched by the clock signal of 256 kHz and outputs "1" as the port P15 is now at "1". The output of the AND gate 40 becomes "1", because the output of the terminal Q8 of the counter 38 remains at "0" even after its cleared state is canceled. Since the D flip-flop 41 is receiving the clock signal of 512 kHz, D flip-flop 41 is latched at "1" with a delay by one half clock pulse of 256 kHz. At the NAND gate 43, the inputs from the D flip-flop 41 and the port P14 are at "1". Therefore, the NAND gate 43 outputs a result of a NAND operation on the clock signal of 512 kHz and the clock signal of 256 kHz.

In other words, the level of the output of the NAND gate 43 becomes low only for a first half of the high level period of the serial clock signal, as shown in FIG. 13 which is a timing chart.

When the serial clock signal which is an output of the OR gate 44 is at a low level, the NMOS gate 51 is turned on to pull down the level of the serial clock terminal 89 to a low level.

When the level of the serial clock signal becomes high, the level of the output of the NAND gate 43 becomes low to turn on the PMOS gate 50. With the PMOS gate 50 turned on, the serial clock terminal 89 is connected to the power supply. When the first half of the high level period of the serial clock signal has elapsed, the PMOS gate 50 is turned off. Then, the serial clock terminal 89 is pulled up to a high level solely by the pull-up resistor 78.

With the level of the serial clock terminal 89 thus caused to become a high level by the PMOS gate 50 only at the time of rise of the serial clock signal, the rise time can be shortened for a higher speed operation.

When 8 pulses of the serial clock signal are transferred, the terminal Q8 of the counter 38 outputs "1" to cause the output of the AND gate 40 to become "0" through the inverter 39. However, since the output of the D flip-flop 41 delays by one half clock pulse, the PMOS gate 50 is in an on-state for a period ending at one half of the last rise of clock pulses of the serial clock signal to cause the serial clock terminal 89 to be at a high level during that period.

On the side of the lens, the counter 72 counts 8 pulses of the serial clock signal. The terminal Q8 of the counter 72 becomes "1" upon receipt of the eighth pulse. However, since the port P20 is at "1", the serial clock signal is delayed at the delay circuit 73 at least by one half clock pulses of the serial clock signal. Then, the RS flip-flop 81 is set through the AND gate 74 and the OR gate 77, so that the level of the serial clock terminal 89 is pulled down to a low level. Therefore, the PMOS gate 50 and NMOS gate 80 never simultaneously turn on to cause any short circuit state between the power supply and the ground.

Further, in the event of an accident causing a short circuit between the serial clock terminal 89 and the ground, no short circuit takes place between the power supply and the ground, since the flow of operation proceeds from the step S75 to the step S76 without turning on the PMOS gate 50.

As described above, there is no danger of short circuit between the power supply and the ground. A high speed communication, therefore, can be safely carried out by the CMOS method.

The camera signal terminal 90 is also arranged to permit a high speed communication by the CMOS method, as follows. The NOR gate 47 outputs an inverted value of serial data. Only when the serial data is at "1", the output of the NAND gate 43 causes, through the OR gate 49, the PMOS gate 52 to be in an on-state for a period of one half of the rise of the clock pulse, at the same timing as described above.

As for the lens signal terminal 91, the PMOS gate 56 turns on to cause the level of the lens signal terminal 91 to be pulled up by the resistors 54 and 55 in parallel for a period of one half of the rise of the clock pulse. Therefore, the lens signal terminal 91 can be caused to quickly rise to a high level.

In a case where the lens is of the conventional type not permitting a high speed communication, the flow of operation proceeds from the step S79 directly to the step S82. In this case, the port P14 does not become "1". Therefore, the communication can be carried out by the conventional open drain method at a low speed, without being switched to the CMOS method permitting a high speed communication.

Referring back to FIG. 8(B), at a step S138, [SB] (shift register 45) is set at "$00". At the next step S139, the camera communicates with the lens. At a step S140, the value AVo, i.e., a full-open aperture value, is set at [SB] (AVo=[SB]). In other words, the full-open aperture value AVo is obtained from the lens by one byte serial communication and the value AVo is stored at the register AVo. At a step S141, the flow returns to the main routine of FIG. 6.

Referring back to FIG. 6, at a step S83, a subroutine for reading the value AVmax is called. Then, steps S142 to S148 shown in FIG. 8(C) are executed to send a command "$03" to the lens, to receive information on a minimum-diameter aperture value from the lens, and to store it at the register AVmax.

Steps S84 to S95 shown in FIG. 6 relate to a routine for obtaining shutter-time and aperture values for a programmed exposure.

At the step S84, the luminance of the object is measured by using the photodiode 20. A measured light value BV thus obtained in an analog form is taken in from the data bus DBUS through the A/D converter 23 and is stored at the register BV. At the next step S85, a film sensitivity value SV which is set by an ISO sensitivity value setting means (not shown) is added to the measured light value BV to obtain an exposure value EV. The value EV is stored at the register EV. At a step S86, a computed aperture value AV is obtained as a value EV/2.

At the next step S87, a check is made to find if the computed aperture value AV is smaller than the full-open aperture value AVo. If not, the flow of operation proceeds to a step S89. If so, the flow proceeds to a step S88. At the step S88, the computed aperture value AV is set at the full-open aperture value AVo, and the flow proceeds to the step S89.

At the step S89, a check is made to find if the computed aperture value AV is larger than the minimum-diameter aperture value AVmax. If not, the flow proceeds to a step S91. If so, the flow proceeds to a step S90. At the step S90, the computed aperture value AV is set at the minimum-diameter aperture value AVmax, and the flow proceeds to the step S91.

At the step S91, a shutter time value TV is obtained by subtracting the value AV from the value EV (EV−AV). At the next step S92, a check is made to find if the shutter time value TV is shorter than 1/500 sec. If not, the flow proceeds to a step S94. If so, the flow proceeds to a step S93. At the step S93, the shutter time value TV is set at 1/500 sec.

At the step S94, a check is made to find if the shutter time value TV is longer than one sec. If not, the flow proceeds to a step S96 which is shown in FIG. 7. If so, the flow proceeds to the step S95 to set the shutter time value TV at one sec. In short, the shutter time is limited between 1/500 sec and one sec.

The shutter time value and the aperture value for a programmed exposure are computed in the above manner.

Steps S96 to S109 shown in FIG. 7 relate to an automatic focusing routine.

At the step S96, a check is made for an in-focus flag JFF. Since the in-focus flag JFF is not set up at this point of time, the flow of operation proceeds to a step S97. At the step S97, the state of lens is read in the same manner as at the step S78 mentioned in the foregoing. At the next step S98, a check is made for the distance ring driving in-process flag LMOVF. Since the distance ring is not moving in the beginning, the flow proceeds to a step S99.

At the step S99, image data is read from the CCD 57 through the data bus DBUS. An amount of defocus is obtained by carrying out a known distance measuring computing operation on the image data. The defocus amount is stored at the register DEF. At a step S100, a subroutine for reading of the best focus correction value BP is called. Then, as shown in FIG. 9(A), a command "$04" is sent to the lens, and a best focus correction value is received from the lens and is stored at the register BP.

At the next step S101, the computed defocus amount is corrected with the best focus correction value. At a step S102, a check is made to find if the defocus amount is close to "0". If so, an in-focus state is assumed to be attained, and the flow proceeds to the step S109. If not, the flow proceeds to a step S103.

At the step S103, the sensitivity S of the lens is read and stored at the register S (see FIG. 9(B)). At a step S104, a lens driving amount LM is obtained by dividing the defocus amount DEF by the sensitivity S. At a step S105, the comb teeth pitch of the lens is read and stored at the register PT. At a step S106, a driving pitch number FP is obtained by dividing the lens driving amount LM by the comb teeth pitch PT (see FIG. 9(C)).

At the next step S107, a subroutine for transmission for driving the lens, which is shown in FIG. 11(C), is called. The subroutine for transmission for driving the lens begins at a step S199 through a step S198.

At the step S199, the shift register 45 ([SB]) is set at "$20". At the next step S200, a command to drive the distance ring is sent to the lens. At a step S201, [SB] is set at "FP/256", wherein FP represents the comb teeth pitch number. At a step S202, an upper byte is obtained by dividing the comb teeth pitch number FP by 256. The upper byte thus obtained is sent to the lens. At a step S203, the shift register 45 ([SB]) is set at a state of [SB]=FP mod 256. In other words, a lower byte is obtained from a remainder resulting from dividing the comb teeth pitch number FP by 256. At a step S204, the lower byte thus obtained is sent to the lens. The flow then returns to the main routine shown in FIG. 7.

Upon receipt of the data mentioned above, the lens control microcomputer 58 begins to drive the distance ring at the steps S43 to S46 shown in FIG. 4. At the step S47 in FIG. 4, the flag LMOV is set at "1".

At the next step S108 in FIG. 7, the release first switch 10 remains in its on-state while the operator is keeping the shutter release button in its first stroke position. During this period, the flow returns to the step S74 in FIG. 6 to execute the steps S74 to S97.

Then, at the step S98, since the flag LMOVF is at "1" with the distance ring driven, the flow proceeds to a step S108 to repeat the steps S74 to S97 until the distance ring driving action comes to an end.

When the distance ring has been driven by the lens as much as the comb teeth number FP indicated by the signal sent, the motor 67 is braked and the flag LMOV is cleared. The flow, therefore, again branches from the step S98 to the step S99.

With the distance measuring computing action and the lens distance ring driving action repeated in this manner, the amount of defocus becomes zero. The flow, therefore, branches from the step S102 to the step S109. At the step S109, the in-focus flag JFF is set at "1" and the distance ring of the lens is judged to be in an in-focus position.

Then, at the step S96, the flow branches to a step S110. At the step S110, a check is made for the state of the release second switch 12. If the switch 12 is found to be in an off-state, the flow proceeds to the step S108 to repeat the steps S74 to S96, S110 and S108 as long as the shutter release button is kept in the first stroke position by the operator as mentioned above. Under this condition, when the shutter release button is pushed further by the operator, the release second switch 12 is turned on. Then, the flow branches from the step S110 to a step S111.

At the step S111, the ports P10, P11 and P12 are set at "1" to turn on the NPN transistors 25, 27 and 29. As a result, the electromagnet 24 for releasing the shutter from a clamped state, the electromagnet 26 for the leading shutter curtain and the electromagnet 28 for the trailing shutter curtain are energized. With the clamp releasing electromagnet 24 energized, a mirror mechanism which is not shown begins to spring up and, at the same time, the shutter is released from the clamped state.

At a step S112, a subroutine for transmission for stopping down the aperture of the lens, which is shown in FIG. 11(A), is called. The subroutine for transmission for stopping down the aperture of the lens begins at a step S187 through a step S186.

At the step S187, the shift register 45 ([SB]) is set at "$10". At a step S188, a command for stopping down the aperture is sent to the lens. At a step S189, [SB] is set at a value "AV–AVo". In other words, data indicative of a number of stopping down steps obtained by subtracting a computed aperture value AV from the full-open aperture value AVo is set at the shift register 45. At a step S190, the data thus set is sent to the lens.

Upon receipt of the data, the lens control microcomputer 58 supplies the data to the diaphragm driving circuit 61 to cause it to stop down the aperture of the diaphragm accordingly.

At a step S191, the flow returns to the main routine shown in FIG. 7.

At a step S113 in FIG. 7, the port P10 is set at "0". At the next step S114, the subroutine for reading the state of the lens as shown in FIG. 10 begins. At a step S115, a check is made for an on-state of the aperture opening switch 63. This check is made by reading the state of lens and is repeated until the aperture opening switch 63 is found to have turned on.

At a step S116, the leading shutter curtain is allowed to travel by cutting off a current applied to the leading shutter curtain electromagnet 26. At a step S117, the flow of operation waits for a period of time corresponding to the computed shutter time value TV. At a step S118, the trailing shutter curtain is allowed to travel by cutting off a current applied to the trailing shutter curtain electromagnet 28. At the next step S119, data of the stopping-down amount of "0" is sent to the lens control microcomputer 58 (see FIG. 11(B)), in about the same manner as in sending the stopping-down signal. Upon receipt of this data, the lens control microcomputer 58 causes the diaphragm driving circuit 61 to bring the diaphragm 60 back to its full-open position.

At a step S120, the port P05 is set at "0" and the port P07 at "1" to turn on the PNP transistor 16 and the NPN transistor 19 for driving the motor 15. With the motor 15 thus driven, a film winding action and a shutter charging action are performed.

At a step S121, the flow waits until the winding completion switch 14 turns on, while repeating the step S121.

At the next step S122, with the winding completion switch 14 having turned on to indicate completion of the film winding and shutter charging actions, the ports P05 and P04 are set at "1" to turn off the PNP transistor 16 and to turn on the NPN transistors 18 and 19. The driving action of the motor 15 is thus brought to a stop by grounding both ends of the motor 15.

At a step S123, the flow waits for a braking time of 10 ms. At the next step S124, the ports P04 and P07 are set at "0" to turn off the NPN transistors 18 and 19. The flow of operation then returns to the step S74.

A series of processes for exposing and winding the film are carried out as described above.

When a finger of the operator is detached from the shutter release button with the photographing action coming to an end, the release first switch 10 turns off, and the flow of operation branches from the step S108 to a step S125.

At the step S125, a command "$40" is sent to the lens control microcomputer 58 (see FIG. 12(B)). Then, the lens control microcomputer 58 ceases to operate through the steps S51 to S55.

At the next step S126, the supply of power to the DC/DC converter 2 is turned off. At a step S127, the operation of the camera control microcomputer 1 is brought to a stop.

After that, when the shutter release button is pushed again, the camera control microcomputer 1 comes to operate, executing its resetting process to begin with. When the communication in one byte is made with the lens, the lens control microcomputer 58 again comes to operate, executing the step S56 to begin with.

A series of operations of the embodiment has been described in the foregoing.

As apparent from the foregoing description, the arrangement according to this invention permits a higher speed of communication between the camera and the lens than the conventional arrangement, by introducing a novel communication method without losing interchangeability or compatibility with the conventional communication method.

Further, in accordance with this invention, the novel communication method can be introduced for a high speed communication between the camera and the lens without losing interchangeability or compatibility with the open drain type communication method and without running the hazard of causing a short circuit between the power source and the ground which has been a shortcoming of the CMOS method.

Further, in the embodiment described above, the communication method is arranged to be switched from the open drain type communication method over to the CMOS type communication method. However, in accordance with this invention, the open drain type communication method may be arranged to be switched over to a method which is other than the CMOS type and is also suited to communication at a higher speed than the open drain type communication method.

I claim:

1. A camera system arranged to communicate information between a camera and an accessory mounted on said camera by a first communication method and a second communication method, comprising:

a determination circuit which determines a type of said accessory mounted on said camera;

a communication circuit which performs communication by the first communication method when being in a first state and performs communication by the second communication method when being in a second state; and a selection circuit which, in accordance with a determination result provided by said determination circuit, selects a state of said communication circuit and selects a frequency of a communication clock signal.

2. A camera system according to claim 1, wherein said accessory is provided with data for designating communication methods, and wherein, when said data is data designating the second communication method, said selection circuit selects the second state as the state of said communication circuit and selects a high frequency as the frequency of the communication clock signal.

3. A camera system according to claim 1, wherein said communication circuit performs communication by the first communication method after said accessory is mounted on said camera to cause said determination circuit to determine characteristics of said accessory, and, if said accessory mounted on said camera is determined to be suited for the second communication method, said selection circuit switches the state of said communication circuit from the first state to the second state.

4. A camera system according to claim 3, wherein the communication by the first communication method is performed with said communication circuit in the first state and with the communication clock signal at a low frequency.

5. A camera system according to claim 1, wherein the first communication method is an open drain method and the second communication method is a CMOS method.

6. A camera system according to claim 2, wherein the first communication method is an open drain method and the second communication method is a CMOS method.

7. A camera system according to claim 3, wherein the first communication method is an open drain method and the second communication method is a CMOS method.

8. A camera system according to claim 1, wherein the first communication method is an open drain method and the second communication method is another open drain method including a step of driving by a CMOS method only for a period of time shorter than one half period of a communication clock signal to be used for the first communication method.

9. A camera system according to claim 2, wherein the first communication method is an open drain method and the second communication method is another open drain method including a step of driving by a CMOS method only for a period of time shorter than one half period of a communication clock signal to be used for the first communication method.

10. A camera system according to claim 3, wherein the first communication method is an open drain method and the second communication method is another open drain method including a step of driving by a CMOS method only for a period of time shorter than one half period of a communication clock signal to be used for the first communication method.

11. An accessory adapted for use with a camera which has a determination circuit arranged to determine a type of said accessory mounted on said camera, selects, in accordance with a determination result provided by said determination circuit, one of a clock signal of a first frequency and a clock signal of a second frequency which is higher than the first frequency and communicates information with said accessory by using the selected clock signal, comprising:

a communication processing circuit which causes said accessory to perform communication with said camera; and a setting circuit which sets, in accordance with the determination result provided by said determination circuit, said communication processing circuit into a state suited for the selected clock signal.

12. An accessory according to claim 11, wherein said accessory is provided with data for designating clock signals, and wherein, when said data is data designating the clock signal of the second frequency, said setting circuit switches the state of said communication processing circuit from a first state to a second state.

13. An accessory according to claim 11, wherein said accessory performs communication by using the clock signal of the first frequency and by setting said communication processing circuit into a first state after said accessory is mounted on said camera to cause said determination circuit to determine characteristics of said accessory, and, if said accessory mounted on said camera is determined to be suited for communication by the clock signal of the second frequency, said setting circuit switches the state of said communication processing circuit from the first state to a second state.

14. An accessory according to claim 11, wherein said communication processing circuit has a first state which is suited for an open drain method and a second state which is suited for a CMOS method.

15. An accessory according to claim 12, wherein the first state of said communication processing circuit is a state corresponding to an open drain method and the second state of said communication processing circuit is a state corresponding to a CMOS method.

16. An accessory according to claim 13, wherein the first state of said communication processing circuit is a state corresponding to an open drain method and the second state of said communication processing circuit is a state corresponding to a CMOS method.

17. An accessory according to claim 11, wherein said communication processing circuit has a first state which is suited for an open drain method and a second state which is suited for another open drain method including a step of driving by a CMOS method only for a period of time shorter than one half period of a communication clock signal to be used in the first state.

18. An accessory according to claim 12, wherein the first state of said communication processing circuit is a state corresponding to an open drain method and the second state of said communication processing circuit is a state corresponding to another open drain type method including a step of driving by a CMOS method only for a period of time shorter than one half period of a communication clock signal to be used in the first state.

19. An accessory according to claim 13, wherein the first state of said communication processing circuit is a state corresponding to an open drain method and the second state of said communication processing circuit is a state corresponding to another open drain type method including a step of driving by a CMOS method only for a period of time shorter than one half period of a communication clock signal to be used in the first state.

20. A camera adapted for use in a camera system arranged to communicate information between said camera and an accessory mounted on said camera by a first communication method and a second communication method, comprising:

a determination circuit which determines a type of said accessory mounted on said camera;

a communication circuit which performs communication by the first communication method when being in a first state and performs communication by the second communication method when being in a second state; and a selection circuit which, in accordance with a determination result provided by said determination circuit, selects a state of said communication circuit and selects a frequency of a communication clock signal.

21. A camera according to claim 20, wherein said accessory is provided with data for designating communication methods, and wherein, when said data is data designating the second communication method, said selection circuit selects the second state as the state of said communication circuit and selects a high frequency as the frequency of the communication clock signal.

22. A camera according to claim 20, wherein said communication circuit performs communication by the first communication method after said accessory is mounted on said camera to cause said determination circuit to determine characteristics of said accessory on the basis of information transmitted from said accessory by the communication, and, if said accessory mounted on said camera is determined to be suited for the second communication method, said selection circuit switches the state of said communication circuit from the first state to the second state.

23. A camera according to claim 20, wherein the communication by the first communication method is performed with said communication circuit in the first state and with the communication clock signal at a low frequency.

24. A camera according to claim 20, wherein the first communication method is an open drain method and the second communication method is a CMOS method.

25. A camera according to claim 21, wherein the first communication method is an open drain method and the second communication method is a CMOS method.

26. A camera according to claim 22, wherein the first communication method is an open drain method and the second communication method is a CMOS method.

27. A camera according to claim 20, wherein the first communication method is an open drain method and the second communication method is another open drain method including a step of driving by a CMOS method only for a period of time shorter than one half period of a communication clock signal to be used for the first communication method.

28. A camera according to claim 21, wherein the first communication method is an open drain method and the second communication method is another open drain method including a step of driving by a CMOS method only for a period of time shorter than one half period of a communication clock signal to be used for the first communication method.

29. A camera according to claim 22, wherein the first communication method is an open drain method and the second communication method is another open drain method including a step of driving by a CMOS method only for a period of time shorter than one half period of a communication clock signal to be used for the first communication method.

30. A camera system arranged to perform communication between a camera and an accessory mounted on said camera in synchronism with clock pulses, comprising:

a first switching element connected to a power supply line and a second switching element connected to a ground line, said first and second switching elements being connected in series to each other and being disposed on the side of said camera;

a camera-side terminal connected to a junction point between said first and second switching elements;

an accessory-side terminal connected to said camera-side terminal;

a pull-up resistor connected to said accessory-side terminal;

a clock pulse input circuit connected to a junction point between said pull-up resistor and said accessory-side terminal;

a clock circuit arranged to apply clock pulses to a gate of said second switching element, said second switching element performing an on-off action in synchronism with the clock pulses; and a control circuit arranged to cause said first switching element to be in an on-state for a period of time shorter than a period during which said second switching element is in an off-state in synchronism with the clock pulses when said second switching element shifts from an on-state to the off-state.

31. A camera system according to claim 30, wherein said control circuit has a mode of causing said first switching element to remain in an off-state.

32. A camera system according to claim 31, wherein said camera is provided with a determination circuit arranged to determine characteristics of said accessory mounted on said camera, and wherein said control circuit decides, according to the characteristics determined, whether or not control is to be performed to cause said first switching element to be in an on-state for the period of time shorter than the period during which said second switching element is in an off-state in synchronism with the clock pulses.

33. A camera system according to claim 1, wherein the first communication method is an open drain method and the second communication method is a communication method which is more suited for high-speed communication than the open drain method.

34. A camera system according to claim 2, wherein the first communication method is an open drain method and the second communication method is a communication method which is more suited for high-speed communication than the open drain method.

35. A camera system according to claim 3, wherein the first communication method is an open drain method and the second communication method is a communication method which is more suited for high-speed communication than the open drain method.

36. An accessory according to claim 12, wherein the first state of said communication processing circuit is a state corresponding to an open drain method and the second state of said communication processing circuit is a state corresponding to a communication method which is more suited for high-speed communication than the open drain method.

37. A camera according to claim 20, wherein the first communication method is an open drain method and the second communication method is a communication method which is more suited for high-speed communication than the open drain method.

38. A camera according to claim 21, wherein the first communication method is an open drain method and the second communication method is a communication method which is more suited for high-speed communication than the open drain method.

39. A camera according to claim 22, wherein the first communication method is an open drain method and the second communication method is a communication method which is more suited for high-speed communication than the open drain method.

40. A camera system arranged to communicate information between a camera and an accessory mounted on said camera, comprising:
 a determination circuit which determines a type of said accessory mounted on said camera;
 a communication circuit; and
 a selection circuit which, in accordance with a determination result provided by said determination circuit, selects one of a communication clock signal of a first frequency and a communication clock signal of a second frequency which is higher than the first frequency.

41. A camera system according to claim 40, wherein said communication circuit comprises:
 a first switching element connected to a power supply line and a second switching element connected to a ground line, said first and second switching elements being connected in series to each other and being disposed on the side of said camera;
 a camera-side terminal connected to a junction point between said first and second switching elements;
 an accessory-side terminal connected to said camera-side terminal;
 a pull-up resistor connected to said accessory-side terminal;
 a clock pulse input circuit connected to a junction point between said pull-up resistor and said accessory-side terminal; and
 a clock circuit arranged to apply clock pulses to a gate of said first switching element and a gate of said second switching element.

42. A camera adapted for use in a camera system arranged to communicate information between said camera and an accessory mounted on said camera, comprising:
 a determination circuit which determines a type of said accessory mounted on said camera;
 a communication circuit; and
 a selection circuit which, in accordance with a determination result provided by said determination circuit, selects one of a communication clock signal of a first frequency and a communication clock signal of a second frequency which is higher than the first frequency.

* * * * *

UNITED STATES PATENT AND TRADEMARK OFFICE
CERTIFICATE OF CORRECTION

PATENT NO. : 5,781,818
DATED : July 14, 1998
INVENTOR(S) : RYUICHI KOBAYASHI

It is certified that error appears in the above-identified patent and that said Letters Patent is hereby corrected as shown below:

Column 2

Line 16, "an" should read --a--.

Column 7

Line 39, "S31," should read --S11,--.

Column 8

Line 48, "tuned" should read --turned--.

Column 11

Line 4, "b ring" should read --bring--.

UNITED STATES PATENT AND TRADEMARK OFFICE
CERTIFICATE OF CORRECTION

PATENT NO. : 5,781,818
DATED : July 14, 1998
INVENTOR(S) : RYUICHI KOBAYASHI

It is certified that error appears in the above-identified patent and that said Letters Patent is hereby corrected as shown below:

Column 14

Line 3, "a" should read --an--.

Column 16

Line 17, "If" should read --If it--.

Signed and Sealed this

Twenty-seventh Day of April, 1999

Attest:

Q. TODD DICKINSON

Attesting Officer

Acting Commissioner of Patents and Trademarks